US012764572B2

(12) United States Patent
Eklöf et al.

(10) Patent No.: US 12,764,572 B2
(45) Date of Patent: Oct. 13, 2026

(54) MOBILITY HANDLING FOR QoE

(71) Applicant: Telefonaktiebolaget LM Ericsson (publ), Stockholm (SE)

(72) Inventors: Cecilia Eklöf, Täby (SE); Ali Parichehrehteroujeni, Linköping (SE); Filip Barac, Huddinge (SE); Luca Lunardi, Genoa (IT); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 468 days.

(21) Appl. No.: 18/032,667

(22) PCT Filed: Oct. 21, 2021

(86) PCT No.: PCT/IB2021/059739
§ 371 (c)(1),
(2) Date: Apr. 19, 2023

(87) PCT Pub. No.: WO2022/084926
PCT Pub. Date: Apr. 28, 2022

(65) Prior Publication Data

US 2023/0388830 A1 Nov. 30, 2023

Related U.S. Application Data

(60) Provisional application No. 63/104,297, filed on Oct. 22, 2020.

(51) Int. Cl.
*H04W 24/08* (2009.01)
*H04W 36/00* (2009.01)

(52) U.S. Cl.
CPC ....... *H04W 24/08* (2013.01); *H04W 36/0085* (2018.08)

(58) Field of Classification Search
None
See application file for complete search history.

(56) References Cited

U.S. PATENT DOCUMENTS

2005/0089043 A1 4/2005 Seckin et al.

FOREIGN PATENT DOCUMENTS

WO 2019073340 A1 4/2019
WO 2020128657 A1 6/2020

OTHER PUBLICATIONS

Ericsson, "R2-1912639: Corrections of QoE measurement collection," 3GPP TSG RAN2 Meeting #107bis, Oct. 14-18, 2019, 79 pages (Year: 2019).*

(Continued)

*Primary Examiner* — Saad Khawar
(74) *Attorney, Agent, or Firm* — Withrow & Terranova, PLLC

(57) ABSTRACT

Systems and methods are disclosed for mobility handling for Quality of Experience (QoE) measurements in a cellular communications system. In one embodiment, a method performed by a User Equipment (UE) comprises receiving, at a Radio Resource Control (RRC) layer of the UE, an indication to release a QoE measurement configuration from a network node. The method further comprises either: (a) refraining, at the RRC layer of the UE, from sending a release request for the QoE measurement configuration to an application layer of the UE until a session associated with the QoE measurement configuration has ended or (b) sending, from the RRC layer of the UE to the application layer of the UE, a request to release the QoE measurement configuration that indicates that the application layer is to release the QoE measurement configuration once the session associated with the QoE measurement configuration has ended.

12 Claims, 16 Drawing Sheets

(56) References Cited

OTHER PUBLICATIONS

Ericsson, "R2-1912638: Discussion on incoming LS for QoE measurement collection in LTE," 3GPP TSG RAN2 Meeting #107bis, Oct. 14-18, 2019, 6 pages (Year: 2019).*
Author Unknown, "Technical Specification Group Services and System Aspects; System architecture for the 5G System (5GS); Stage 2 (Release 16)," Technical Specification 23.501, Version 16.6.0, Sep. 2020, 3GPP Organizational Partners, 447 pages.
Author Unknown, "Technical Specification Group Radio Access Network; Radio Resource Control (RRC); Protocol specification (Release 16)," Technical Specification 25.331, Version 16.1.0, Sep. 2020, 3GPP Organizational Partners, 2,319 pages.
Author Unknown, "Technical Specification Group Services and System Aspects; IP Multimedia Subsystem (IMS); Multimedia Telephony; Media handling and interaction (Release 16)," Technical Specification 26.114, Version 16.7.0, Sep. 2020, 3GPP Organizational Partners, 445 pages.
Author Unknown, "Technical Specification Group Core Network and Terminals; AT command set for User Equipment (UE) (Release 16)," Technical Specification 27.007, Version 16.6.0, Sep. 2020, 3GPP Organizational Partners, 405 pages.
Author Unknown, "Technical Specification Group Services and System Aspects; Telecommunication management; Quality of Experience (QoE) measurement collection; Control and configuration (Release 16)," Technical Specification 28.405, Version 16.0.0, Jul. 2020, 3GPP Organizational Partners, 16 pages.
Author Unknown, "Technical Specification Group Services and System Aspects; Network Domain Security (NDS); IP network layer security (Release 16)," Technical Specification 33.210, Version 16.4.0, Jul. 2020, 3GPP Organizational Partners, 27 pages.
Author Unknown, "Technical Specification Group Services and System Aspects; Security architecture and procedures for 5G system (Release 16)," Technical Specification 33.501, Version 16.4.0, Sep. 2020, 3GPP Organizational Partners, 250 pages.
Author Unknown, "Technical Specification Group Radio Access Network; Evolved Universal Terrestrial Radio Access (E-UTRA); Radio Resource Control (RRC); Protocol specification (Release 16)," Technical Specification 36.331, Version 16.2.0, Sep. 2020, 3GPP Organizational Partners, 1,081 pages.
Author Unknown, "Technical Specification Group Radio Access Network; Evolved Universal Terrestrial Radio Access Network (E-UTRAN); X2 application protocol (X2AP) (Release 16)," Technical Specification 36.423, Version 16.3.0, Sep. 2020, 3GPP Organizational Partners, 496 pages.
Author Unknown, "Technical Specification Group Radio Access Network; NR; NR and NG-RAN Overall Description; Stage 2 (Release 16)," Technical Specification 38.300, Version 16.3.0, Sep. 2020, 3GPP Organizational Partners, 148 pages.
Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.
Author Unknown, "Technical Specification Group Radio Access Network; NG-RAN; Xn application protocol (XnAP) (Release 16)," Technical Specification 38.423, Version 16.3.0, Sep. 2020, 3GPP Organizational Partners, 451 pages.
Huawei, "R3-205283: Potential RAN3 impacts about QoE measurement," 3GPP TSG-RAN WG3 #109-e, Aug. 17-28, 2020, Electronic Meeting, 6 pages.
SA4, "S4-200962: LS Reply on QoE Measurement Collection," 3GPP TSG-SA4 Meeting #109-e, May 20-Jun. 3, 2019, 2 pages.
Invitation to Pay Additional Fees and Partial Search for International Patent Application No. PCT/IB2021/059739, mailed Jan. 21, 2022, 17 pages.
International Search Report and Written Opinion for International Patent Application No. PCT/IB2021/059739, mailed Mar. 15, 2022, 22 pages.

* cited by examiner

MOBILITY HANDLING FOR QoE

RELATED APPLICATIONS

This application is a 35 U.S.C. § 371 national phase filing of International Application No. PCT/IB2021/059739, filed Oct. 21, 2021, which claims the benefit of provisional patent application Ser. No. 63/104,297, filed Oct. 22, 2020, the disclosures of which are hereby incorporated herein by reference in their entireties.

TECHNICAL FIELD

The present disclosure relates to a cellular communications network and, more specifically, to application-layer measurements (e.g., Quality of Experience (QoE) measurements) in a cellular communications network.

BACKGROUND

1 Overall Architecture of Next Generation Radio Access Network (NG-RAN)

As illustrated in FIG. 1, in the Third Generation Partnership Project (3GPP) Fifth Generation System (5GS), the NG-RAN includes a set of next generation Node Bs (gNBs) connected to the Fifth Generation Core (5GC) through the NG interface. Note that, as specified in 3GPP TS 38.300, the NG-RAN could also include of a set of next generation evolved Node Bs (ng-eNBs). An ng-eNB may include an ng-eNB Central Unit (ng-eNB-CU) and one or more ng-eNB Distributed Units (ng-eNB-DUs). An ng-eNB-CU and an ng-eNB-DU is connected via a W1 interface. The general principle described here also applies to ng-eNB and a W1 interface, if not explicitly specified otherwise. An gNB can support Frequency Division Duplexing (FDD) mode, Time Division Duplexing (TDD) mode, or dual mode operation. gNBs can be interconnected through the Xn interface. A gNB may include a gNB Central Unit (gNB-CU) and one or more gNB Distributed Units (gNB-DUs). A gNB-CU and a gNB-DU is connected via an F1 interface. One gNB-DU is connected to only one gNB-CU. Note that, in case of network sharing with multiple cell identity (ID) broadcast, each Cell Identity associated with a subset of Public Land Mobile Networks (PLMNs) corresponds to a gNB-DU and the gNB-CU it is connected to, i.e., the corresponding gNB-DUs share the same physical layer cell resources. Also note that, for resiliency, a gNB-DU may be connected to multiple gNB-CUs by appropriate implementation. NG, Xn, and F1 are logical interfaces. For NG-RAN, the NG and Xn-C interfaces for a gNB consisting of a gNB-CU and gNB-DUs terminate in the gNB-CU. For Evolved Universal Terrestrial Radio Access (E-UTRA) New Radio (NR) Dual Connectivity (EN-DC), the S1-U and X2-C interfaces for a gNB consisting of a gNB-CU and gNB-DUs terminate in the gNB-CU. The gNB-CU and connected gNB-DUs are only visible to other gNBs and the 5GC as a gNB.

The node hosting the user plane part of NR Packet Data Convergence Protocol (PDCP) (e.g., gNB-CU, gNB-CU User Plane (gNB-CU-UP), and for EN-DC, Master eNB (MeNB) or Secondary gNB (SgNB) depending on the bearer split) performs user inactivity monitoring and further informs its inactivity or (re)activation to the node having control plane (C-plane) connection towards the core network (e.g., over E1, X2). The node hosting NR Radio Link Control (RLC) (e.g., gNB-DU) may perform user inactivity monitoring and further inform its inactivity or (re)activation to the node hosting control plane, e.g. gNB-CU or gNB-CU Control Plane (gNB-CU-CP). Uplink (UL) PDCP configuration (i.e., how the User Equipment (UE) uses the UL at the assisting node) is indicated via X2-C (for EN-DC), Xn-C (for NG-RAN) and F1-C. Radio Link Outage/Resume for downlink (DL) and/or UL is indicated via X2-U (for EN-DC), Xn-U (for NG-RAN) and F1-U.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport, signalling transport. In NG-Flex configuration, each NG-RAN node is connected to all Access and Mobility Management Functions (AMFs) of AMF Sets within an AMF Region supporting at least one slice also supported by the NG-RAN node. The AMF Set and the AMF Region are defined in 3GPP TS 23.501. If security protection for control plane and user plane data on TNL of NG-RAN interfaces has to be supported, Network Domain Security (NDS)/Internet Protocol (IP) 3GPP TS 33.501 is applied.

2 Overall Architecture for Separation of gNB-CU-CP and gNB-CU-UP

The overall architecture for separation of gNB-CU-CP and gNB-CU-UP is depicted in FIG. 2.

As illustrated, a gNB may have a gNB-CU-CP, multiple gNB-CU-UPs, and multiple gNB-DUs. The gNB-CU-CP is connected to the gNB-DU through the F1-C interface. The gNB-CU-UP is connected to the gNB-DU through the F1-U interface. The gNB-CU-UP is connected to the gNB-CU-CP through the E1 interface. One gNB-DU is connected to only one gNB-CU-CP. One gNB-CU-UP is connected to only one gNB-CU-CP.

For resiliency, a gNB-DU and/or a gNB-CU-UP may be connected to multiple gNB-CU-CPs by appropriate implementation. One gNB-DU can be connected to multiple gNB-CU-UPs under the control of the same gNB-CU-CP. One gNB-CU-UP can be connected to multiple DUs under the control of the same gNB-CU-CP. The connectivity between a gNB-CU-UP and a gNB-DU is established by the gNB-CU-CP using Bearer Context Management functions. The gNB-CU-CP selects the appropriate gNB-CU-UP(s) for the requested services for the UE. In case of multiple CU-UPs they belong to same security domain as defined in 3GPP TS 33.210. Data forwarding between gNB-CU-UPs during intra-gNB-CU-CP handover within a gNB may be supported by Xn-U.

3 Quality of Experience (QoE) Measurements in Legacy Solution

Quality of Experience (QoE) measurements have been specified for Long Term Evolution (LTE) and Universal Mobile Telecommunications Systems (UMTS). The purpose of the application layer measurements is to measure the end user experience when using certain applications. Currently, QoE measurements for streaming services and for Mobility Telephony Service for IP Multimedia Subsystem (IMS) (MTSI) services are supported.

The solutions in LTE and UMTS are similar with the overall principles as follows. QoE Measurement Collection enables configuration of application layer measurements in the UE and transmission of QoE measurement result files by means of Radio Resource Control (RRC) signalling. Application layer measurement configuration received from Operations and Management (OAM) or Core Network (CN) is encapsulated in a transparent container, which is forwarded to UE in a downlink RRC message. Application layer measurements received from UE's higher layer are encapsulated in a transparent container and sent to network in an uplink RRC message. The result container is then forwarded to a Trace Collector Entity (TCE).

In 3GPP Release 17, a new study item for "Study on NR QoE management and optimizations for diverse services" for NR has been approved. The purpose of the study item is to study solutions for QoE measurements in NR. QoE management in NR will not just collect the experience parameters of streaming services but also consider the typical performance requirements of diverse services (e.g., Augmented Reality (AR)/Virtual Reality (VR) and Ultra-Reliable Low-Latency Communication (URLLC)). Based on requirements of services, the NR study will also include more adaptive QoE management schemes that enable network intelligent optimization to satisfy user experience for diverse services.

The measurements may be initiated towards the Radio Access Network (RAN) in a management-based manner, i.e., from an O&M node in a generic way e.g., for a group of UEs, or they may also be initiated in a signaling-based manner, i.e., initiated from CN to RAN e.g., for a single UE. The configuration of the measurement includes the measurement details, which is encapsulated in a container that is transparent to RAN.

The UE can provide its capability using the "UE Capability Information" RRC message as shown in FIG. 4.

The "UE Capability Information" message can include the "UE radio access capability", as shown in the excerpt from 3GPP TS 25.331 in Table 1 below.

TABLE 1

Excerpt of "UE Capability Information" IE from 3GPP TS 25.331

| Information Element/Group name | Need | Multi | Type and reference | Semantics description | Version |
|---|---|---|---|---|---|
| Measurement capability | OP | | Measurement capability 10.3.3.21 | | |

The "Measurement Capability" IE can be used by the UE to transfer to the UTRAN the information related to the capability to perform the QoE measurement collection for streaming services and/or MTSI services. Table 2 below provides an extract of the "Measurement Capability" IE from 3GPP TS 25.331.

TABLE 2

Excerpt of the "Measurement Capability" IE from 3GPP TS 25.331

| Information Element/Group name | Need | Multi | Type and reference | Semantics description | Version |
|---|---|---|---|---|---|
| QoE Measurement Collection for streaming services | CV-not_iRAT_HoInfo | | Enumerated (TRUE) | TRUE means that the UE supports QoE Measurement Collection for streaming services. | REL-14 |
| QoE Measurement Collection for MTSI services | CV-not_iRAT_HoInfo | | Enumerated (TRUE) | TRUE means that the UE supports QoE Measurement Collection for MTSI services. | REL-15 |

When initiated via the CN, the measurement is started towards a specific UE. For the LTE case, the "TRACE START" S1AP message is used, which carries, among other things, the details about the measurement configuration for the measurements that the application should collect (in the "Container for application layer measurement configuration" Information Element (IE), which is transparent to the RAN) and the details to reach the TCE to which the measurements should be sent.

The RAN is not aware of when the streaming session is ongoing in the UE. The Access Stratum is also not aware of when the measurements are ongoing. When the RAN is to stop the measurements is an implementation decision. Typically, this is done when the UE has moved outside the measured area.

One opportunity provided by the legacy solution is to also be able to keep the QoE measurement(s) for the whole session, even during a handover situation.

4 QoE measurement in Universal Terrestrial Radio Access Network (UTRAN)

4.1 UTRAN—Application Layer Measurement Capabilities

According to 3GPP TS 25.331, the UTRAN can request the UE (via "UE Capability Enquiry") to report its capability, as shown in FIG. 3.

4.2 UTRAN—QoE Measurement Configuration—RRC Signaling

To configure QoE measurement in the UE, the UTRAN can send a "Measurement Control" RRC message containing "Application layer measurement configuration", as illustrated in FIG. 5. Note that the terms "QoE measurement configuration" and "QoE configuration" are used interchangeably herein.

The content of the "Application layer measurement configuration" IE is represented in Table 3 below.

TABLE 3

"Application Layer Measurement Configuration" IE

| Information Element/Group name | Need | Multi | Type and reference | Semantics description | Version |
|---|---|---|---|---|---|
| Container for application layer measurement configuration | MP | | Octet string (1 . . . 1000) | | REL-14 |

TABLE 3-continued

"Application Layer Measurement Configuration" IE

| Information Element/Group name | Need | Multi | Type and reference | Semantics description | Version |
|---|---|---|---|---|---|
| Service type | MP | | Enumerated (QoEStreaming, QoEMTSI) | | REL-15 |

4.3 UTRAN—QoE Measurement Reporting—RRC Signaling

The UE can send QoE measurement results via UTRAN to the Collecting Entity using the "Measurement Report" RRC message and including the "Application layer measurement reporting" IE, as illustrated in FIG. 6.

The UE may also perform Cell Update with cause "application layer measurement report available" in order to initiate the transfer of application layer measurement report.

Signaling radio bearer RB4 is used for the MEASUREMENT REPORT message carrying the IE "Application layer measurement reporting".

The content of the "Application layer measurement reporting" IE is represented in Table 4 below.

TABLE 4

"Application Layer Measurement Reporting" IE

| Information Element/Group name | Need | Multi | Type and reference | Semantics description | Version |
|---|---|---|---|---|---|
| Container for application layer measurement reporting | MP | | Octet string (1 . . . 8000) | | REL-14 |
| Service type | MP | | Enumerated (QoEStreaming, QoEMTSI) | | REL-15 |

QoE Measurement in Evolved Universal Terrestrial Radio Access Network (E-UTRAN)

For E-UTRAN, the UE capability transfer is used to transfer UE radio access capability information from the UE to E-UTRAN, as illustrated in FIG. 7.

The UE-EUTRA-Capability IE is used to convey the E-UTRA UE Radio Access Capability Parameters and the Feature Group Indicators for mandatory features to the network. In the response message "UECapabilityInformation", the UE can include the "UE-EUTRA-Capability" IE. The "UE-EUTRA-Capability" IE may include the UE-EUTRA-Capability-v1530-IE, which can be used by the UE to indicate whether the UE supports or not QoE Measurement Collection for streaming services and/or MTSI services, as detailed in the "MeasParameters-v1530".

5.1 E-UTRAN—Application Layer Measurement Reporting

The purpose of the "Application layer measurement reporting" procedure described in 3GPP TS 36.331 and shown in FIG. 8 is to inform E-UTRAN about an application layer measurement report.

A UE capable of application layer measurement reporting in RRC_CONNECTED may initiate the procedure when configured with application layer measurement, i.e., when measConfigAppLayer has been configured by E-UTRAN.

As described in 3GPP TS 36.331, upon initiating the procedure, the UE shall:

1> if configured with application layer measurement, and SRB4 is configured, and the UE has received application layer measurement report information from upper layers:

2> set the measReportAppLayerContainer in the MeasReportAppLayer message to the value of the application layer measurement report information;

2> set the serviceType in the MeasReportAppLayer message to the type of the application layer measurement report information;

2> submit the MeasReportAppLayer message to lower layers for transmission via SRB4.

5.2 E-UTRAN—QoE Measurement Configuration Setup and Release—RRC Signaling

The RRCConnectionReconfiguration message is used to reconfigure the UE to setup or release the UE for Application Layer measurements. This is signaled in the measConfigAppLayer-15 IE within the "OtherConfig" IE.

The setup includes the transparent container measConfigAppLayerContainer which specifies the QoE measurement configuration for the Application of interest and the serviceType IE to indicate the Application (or service) for which the QoE measurements are being configured. Supported services are streaming and MTSI.

5.3 E-UTRAN—QoE Measurement Reporting—RRC Signaling

As specified in 3GPP TS 36.331, the MeasReportAppLayer RRC message is used by the UE to send to the E-UTRAN node the QoE measurement results of an Application (or service). The service for which the report is being sent is indicated in the "serviceType" IE.

6 Handling QoE measurement under Overload RAN Conditions

As part of LTE specification TS 28.405, RAN nodes are allowed to temporarily stop and restart the QoE measurement reporting when an overload situation is observed at RAN nodes. A relevant excerpt from 3GPP TS 28.405 is as follows:

4.2.4 Temporary stop and restart of QoE information reporting during RAN overload in LTE In case of overload in RAN, the eNB may temporarily stop the reporting from the UE by send the RRCConnectionReconfiguration message [9] to relevant UEs. The RRCConnectionReconfiguration message is including measConfigAppLayer set to temporarily stop application layer measurement reporting in otherConfig [9]. The Access stratum sends +CAPPLEVMC AT command [5] to the application with the temporary stop request. The application stops the reporting and stops recording further information when the data in the reporting container is used. Then the recorded data is kept until it is reported or when the UE request session is ended.

When the overload situation in RAN is ended the eNB restart the reporting from the UE by send the RRCConnectionReconfiguration message [9] to relevant UEs. The RRCConnectionReconfiguration message is including measConfigAppLayer set to restart application layer measurement reporting in otherConfig [9]. The Access stratum sends +CAPPLEVMC AT command [5] to the application with the restart request. The application restarts the reporting and recording if it was stopped.

7 QoE Measurement at Mobility

For LTE, it is the network's responsibility to configure the UE with QoE measurements when the UE enters or exits the requested area for QoE. However, if the network releases the QoE measurements when the UE exits the area, there may be an ongoing session and measurements which may be interrupted in the middle of the session. That is currently not in line with requirements from other working groups SA4 and SA5.

In 3GPP TS 26.114 the following is stated (emphasis added):

16.3 Metric Configuration

An MTSI client supporting the QoE metrics feature shall support the OMA-DM solution specified in this clause for configuration of QoE metrics and their activation. The MTSI client shall also support the QMC functionality specified in clause 16.5 for configuration of QoE metrics.

The QoE configuration shall only be checked by the client when each session starts, and thus all logging and reporting criterias for an ongoing session shall be unaffected by any QoE configuration changes received during that session. This also includes evaluation of any filtering criterias, such as geographical filtering, which shall only be done when the session starts. Thus changes to the QoE configuration will only affect sessions started after these configuration changes have been received.

If an MTSI client uses the OMA-DM configuration feature, it is mandatory for the MTSI client to implement the Management Object (MO) as described in this clause.

That means that there is a check if the UE is inside the configured area when the session starts and the UE starts the QoE measurements, but if the UE moves outside the area during the session, the measurements should continue until the end of the session. After the session is completed, the UE should not start any new measurements if it is still outside the area.

It has been discussed in 3GPP how to fulfil this requirement. Only the application layer in the UE is aware of when the session starts and stop, the network has no information about that. The area is currently not sent to the UE, so the UE is not aware of when it exits the area. The network, in the existing solution, only configures the UE with QoE measurements when the UE is inside the area.

SUMMARY

Systems and methods are disclosed for mobility handling for Quality of Experience (QoE) measurements in a cellular communications system. In one embodiment, a method performed by a User Equipment (UE) comprises receiving, at a Radio Resource Control (RRC) layer of the UE, an indication to release a QoE measurement configuration from a network node. The method further comprises either: (a) refraining, at the RRC layer of the UE, from sending a release request for the QoE measurement configuration to an application layer of the UE until a session associated with the QoE measurement configuration has ended or (b) sending, from the RRC layer of the UE to the application layer of the UE, a request to release the QoE measurement configuration that indicates that the application layer is to release the QoE measurement configuration once the session associated with the QoE measurement configuration has ended. In this manner, QoE measurements are handled in a desirable way even during mobility.

In one embodiment, the method comprises refraining, at the RRC layer (904) of the UE, from sending the release request for the QoE measurement configuration to the application layer of the UE until the session associated with the QoE measurement configuration has ended. In one embodiment, the method further comprises, prior to receiving, at the RRC layer of the UE, the indication to release the QoE measurement configuration, receiving, at the RRC layer of the UE from the application layer of the UE, a start indication that indicates that the session associated with the QoE measurement configuration has started. The method further comprise, after receiving, at the RRC layer of the UE, the indication to release the QoE measurement configuration, determining that the session associated to the QoE measurement configuration is ongoing based on reception of the start indication but not a stop indication for the session associated with the QoE measurement configuration. Further, refraining, at the RRC layer of the UE, from sending the release request for the QoE measurement configuration to the application layer of the UE comprises refraining, at the RRC layer of the UE, from sending the release request for the QoE measurement configuration to the application layer of the UE responsive to determining that the session associated to the QoE measurement configuration is ongoing. In one embodiment, the method further comprises, after receiving at the RRC layer of the UE the indication to release the QoE measurement configuration, receiving, at the RRC layer of the UE from the application layer of the UE, a stop indication for the session associated to the QoE measurement configuration and sending, from the RRC layer of the UE to the application layer of the UE, a release request for the QoE measurement configuration responsive to receiving the stop indication for the session associated to the QoE measurement configuration at the RRC layer of the UE. In one embodiment, the method further comprises, at the application layer of the UE, receiving the release request for the QoE measurement configuration from the RRC layer of the UE and releasing the QoE measurement configuration upon receiving the release request from the RRC layer of the UE.

In one embodiment, the method comprises sending, from the RRC layer of the UE to the application layer of the UE, the request to release the QoE measurement configuration that indicates that the application layer is to release the QoE measurement configuration once the session associated with the QoE measurement configuration has ended. In one embodiment, the method further comprises, at the application layer of the UE, receiving, from the RRC layer of the UE, the request to release the QoE measurement configuration that indicates that the application layer is to release the QoE measurement configuration once the session associated with the QoE measurement configuration has ended and releasing the QoE measurement configuration once the session associated with the QoE measurement configuration has ended, responsive to receiving the request to release the QoE measurement configuration that indicates that the application layer is to release the QoE measurement configuration once the session associated with the QoE measurement configuration has ended. In one embodiment, the method further comprises sending, from the application layer of the UE to the RRC layer of the UE, a confirmation that the QoE measurement configuration has been released. In one embodiment, the method further comprises sending, from the RRC layer of the UE to the network node, a confirmation that the QoE measurement configuration has been released.

Corresponding embodiments of a UE are also disclosed. In one embodiment, a UE is adapted to receive, at a RRC layer of the UE, an indication to release a QoE measurement configuration from a network node. The UE is further adapted to either: (a) refrain, at the RRC layer of the UE, from sending a release request for the QoE measurement configuration to an application layer of the UE until a session associated with the QoE measurement configuration has ended or (b) send, from the RRC layer of the UE to the application layer of the UE, a request to release the QoE measurement configuration that indicates that the application layer is to release the QoE measurement configuration once the session associated with the QoE measurement configuration has ended.

In one embodiment, a UE comprises radio front-end circuitry and processing circuitry associated with the radio front-end circuitry. The processing circuitry is configured to case the UE to receive, at a RRC layer of the UE, an indication to release a QoE measurement configuration from a network node. The processing circuitry is further configured to case the UE to either: (a) refrain, at the RRC layer of the UE, from sending a release request for the QoE measurement configuration to an application layer of the UE until a session associated with the QoE measurement configuration has ended or (b) send, from the RRC layer of the UE to the application layer of the UE, a request to release the QoE measurement configuration that indicates that the application layer is to release the QoE measurement configuration once the session associated with the QoE measurement configuration has ended.

Embodiments of a method performed in a network node are also disclosed. In one embodiment, a method performed in a network node comprises refraining from sending a command to release a QoE measurement configuration to a UE until an indication that a session associated to the QoE measurement configuration has completed is received from the UE, receiving, from the UE, an indication that the session associated to the QoE measurement configuration has completed, and sending, to the UE, a command to release the QoE measurement configuration responsive to receiving the indication that the session associated to the QoE measurement configuration has completed. In one embodiment, the steps of refraining, receiving, and sending are performed at a RRC layer of the network node.

Corresponding embodiments of a network node are also disclosed. In one embodiment, a network node is adapted to refrain from sending a command to release a QoE measurement configuration to a UE until an indication that a session associated to the QoE measurement configuration has completed is received from the UE, receive, from the UE, an indication that the session associated to the QoE measurement configuration has completed, and send, to the UE, a command to release the QoE measurement configuration responsive to receiving the indication that the session associated to the QoE measurement configuration has completed.

In one embodiment, a network node comprises processing circuitry configured to cause the network node to refrain from sending a command to release a QoE measurement configuration to a UE until an indication that a session associated to the QoE measurement configuration has completed is received from the UE, receive, from the UE, an indication that the session associated to the QoE measurement configuration has completed, and send, to the UE, a command to release the QoE measurement configuration responsive to receiving the indication that the session associated to the QoE measurement configuration has completed.

Embodiments of a method performed by a first network node are also disclosed herein. In one embodiment, a method performed by a first network node comprises sending a QoE measurement configuration to a UE and receiving from the UE a start indication that indicates that a session associated to the QoE measurement configuration has started. The method further comprises, in relation to handover of the UE from the first network node to a second network node after receiving the start indication but before receiving any stop indication that indicates that the session associated to the QoE measurement configuration has stopped, sending, to the second network node, a handover request for handover of the UE to the second network node, the handover request comprising either: (a) a measurement area for the QoE measurement configuration or (b) an indication of a pending release of the QoE measurement configuration.

Corresponding embodiments of a first network node are also disclosed. In one embodiment, a first network node is adapted to send a QoE measurement configuration to a UE and receive from the UE a start indication that indicates that a session associated to the QoE measurement configuration has started. The first network node is further adapted to, in relation to handover of the UE from the first network node to a second network node after receiving the start indication but before receiving any stop indication that indicates that the session associated to the QoE measurement configuration has stopped, send, to the second network node, a handover request for handover of the UE to the second network node, the handover request comprising either: (a) a measurement area for the QoE measurement configuration or (b) an indication of a pending release of the QoE measurement configuration.

In one embodiment, a first network node comprises processing circuitry configured to cause the first network node to send a QoE measurement configuration to a UE and receive from the UE a start indication that indicates that a session associated to the QoE measurement configuration has started. The processing circuitry is further configured to cause the first network node to, in relation to handover of the UE from the first network node to a second network node after receiving the start indication but before receiving any stop indication that indicates that the session associated to the QoE measurement configuration has stopped, send, to the second network node, a handover request for handover of the UE to the second network node, the handover request comprising either: (a) a measurement area for the QoE measurement configuration or (b) an indication of a pending release of the QoE measurement configuration.

Embodiments of a method performed by a second network node are also disclosed. In one embodiment, a method performed by a second network node comprises receiving, from a first network node, a handover request for handover of a UE from the first network node to the second network node and receiving, from the UE, a stop indication that indicates that a session associated to a QoE measurement configuration of the UE has stopped. The method further comprises, responsive to receiving the stop indication and the UE being outside of a measurement area for the QoE measurement configuration, sending, to the UE, a command to release the QoE measurement configuration.

In one embodiment, the handover request comprises the measurement area for the QoE measurement configuration of the UE.

In one embodiment, the handover request comprises an indication of a pending release of the QoE measurement configuration.

Corresponding embodiments of a second network node are also disclosed. In one embodiment, a second network node is adapted to receive, from a first network node, a handover request for handover of a UE from the first network node to the second network node and receive, from the UE, a stop indication that indicates that a session associated to a QoE measurement configuration of the UE has stopped. The second network node is further adapted to, responsive to receiving the stop indication and the UE being outside of a measurement area for the QoE measurement configuration, sending, to the UE, a command to release the QoE measurement configuration.

In one embodiment, a second network node comprises processing circuitry configured to cause the second network node to receive, from a first network node, a handover request for handover of a UE from the first network node to the second network node and receive, from the UE, a stop indication that indicates that a session associated to a QoE measurement configuration of the UE has stopped. The processing circuitry is further configured to cause the second network node to, responsive to receiving the stop indication and the UE being outside of a measurement area for the QoE measurement configuration, sending, to the UE, a command to release the QoE measurement configuration.

In another embodiment, a method performed by a second network node comprises, in association with a RRC connection re-establishment of a UE to a cell owned by the second network node, sending, to first network node to which the UE was last connected, a request for a UE context of the UE, receiving the UE context of the UE from the first network node, and refraining from sending a command to release the QoE measurement configuration to the UE until an indication that a session associated to the QoE measurement configuration has ended is received from the UE.

Corresponding embodiments of a second network node are also disclosed. In one embodiment, a second network node is adapted to, in association with a RRC connection re-establishment of a UE to a cell owned by the second network node, send, to first network node to which the UE was last connected, a request for a UE context of the UE, receive the UE context of the UE from the first network node, and refrain from sending a command to release the QoE measurement configuration to the UE until an indication that a session associated to the QoE measurement configuration has ended is received from the UE.

In one embodiment, a second network node comprises processing circuitry configured to cause the second network node to, in association with a RRC connection re-establishment of a UE to a cell owned by the second network node, send, to first network node to which the UE was last connected, a request for a UE context of the UE, receive the UE context of the UE from the first network node, and refrain from sending a command to release the QoE measurement configuration to the UE until an indication that a session associated to the QoE measurement configuration has ended is received from the UE.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
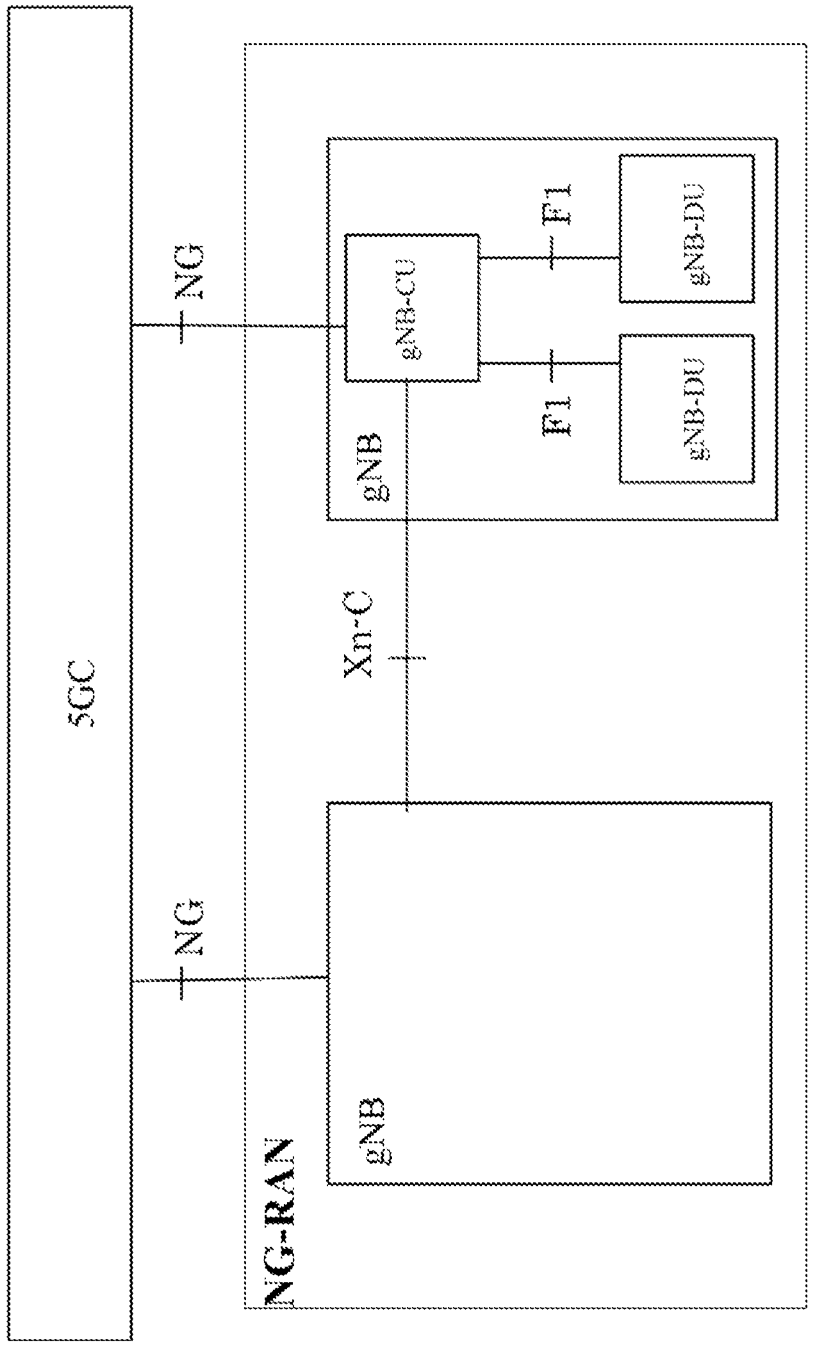
FIG. 1 illustrates the overall architecture of the Next Generation Radio Access Network (NG-RAN) as defined in the 3$^{rd}$ Generation Partnership Project (3GPP)
Figure 2:
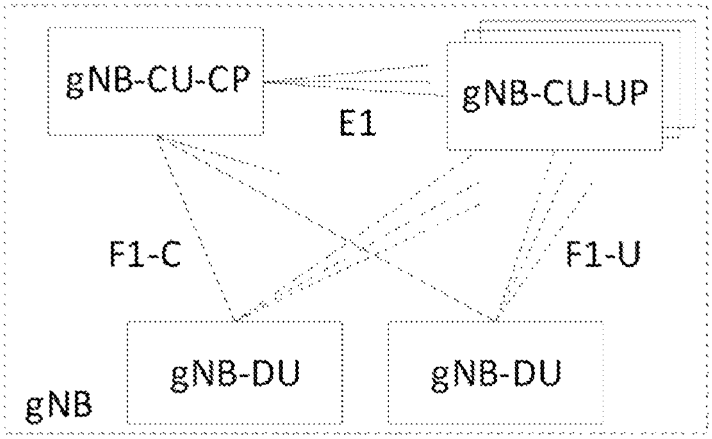
FIG. 2 illustrates the overall architecture for separation of the next generation Node B (gNB) Central Unit (CU) Control Plane (CP) (i.e., the gNB-CU-CP) and the gNB-CU User Plane (gNB-CU-UP) parts as defined in 3GPP.
Figure 3:
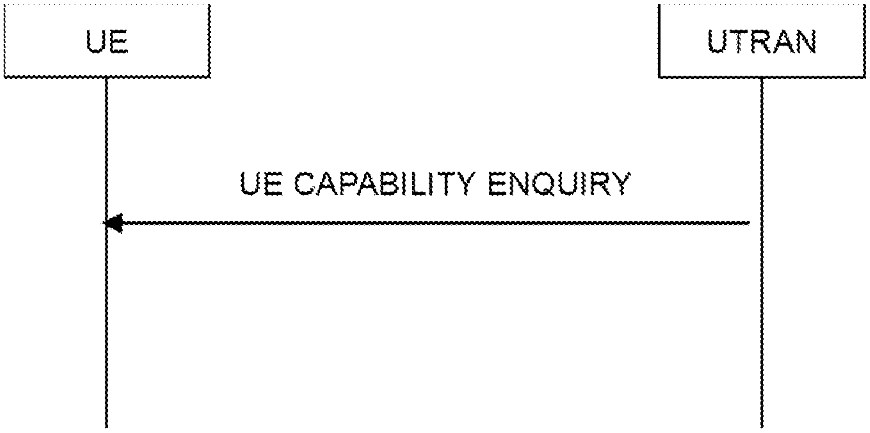
FIG. 3 illustrates the User Equipment (UE) Capability Enquiry as defined in 3GPP Technical Specification (TS) 25.331.
Figure 4:
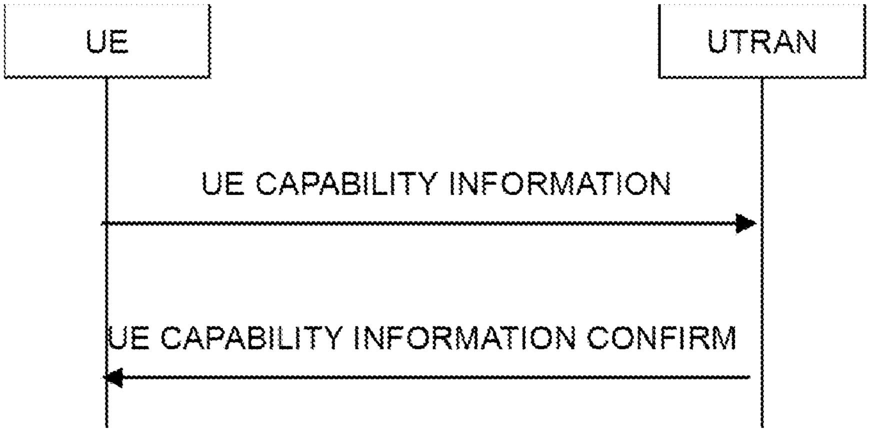
FIG. 4 illustrates the UE Capability Information Radio Resource Control (RRC) message as defined in 3GPP.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc.

are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The terms "UE", "terminal equipment" and "wireless terminal" are used herein interchangeably. The terms "network node" and "RAN node" are used herein interchangeably, where the RAN node can be a gNB, eNB, gNB-CU, gNB-CU-CP, eNB-CU, eNB-CU-CP, Integrated Access and Backhaul (IAB) donor (IAB-donor), IAB donor Central Unit (IAB-donor-CU), or IAB-donor-CU Control Plane (IAB-donor-CU-CP). The terms "application layer measurement", "application measurement" and "QoE measurement" are used herein interchangeably. The terms "modem", "radio layer", "RRC layer" and "radio network layer" are used herein interchangeably. The terms access stratum and radio layer are used herein interchangeably. The solutions proposed in the present disclosure apply to various technologies including to UMTS, LTE, and NR. All references to the application layer are with respect to the application layer of the UE (since RAN nodes do not have an application layer). The solutions proposed in the present disclosure apply to both signaling- and management-based Minimization of Drive Tests (MDT) and QoE measurements.

There currently exist certain challenges in regard to QoE measurements. A problem with existing solutions is that, if the network releases the QoE measurements when the UE exits the measurement area, the network may interrupt the QoE measurements in the middle of the session, which is not according to existing requirements. The network gets no information about when the session starts or ends. The "withinArea" indication has been proposed for LTE to solve this problem, but it is still not implemented in RRC signaling. Now the same issue will be discussed for NR, and different solutions to the problem may be proposed.

The teachings of the disclosure recognize that a reason for the problem is that only the application layer in the UE is aware of when the session starts and stops, but the UE is not aware of the measurement area. The network is aware of the measurement area, but the network is not aware of when the session starts and stops.

Certain aspects of the present disclosure and their embodiments may provide solutions to these or other challenges. The present disclosure proposes new solutions to fulfil the requirement that QoE measurements should continue until the end of the session, even if the UE moves outside the measurement area during the session. In the solutions, the network controls the start and stop of the QoE measurements due to area updates.

In one solution, the network sends a release command to release QoE measurements. The Radio Resource Control (RRC) layer however does not release the measurements right away, but sends a release command to the application layer to release the measurements when the session is completed. When the session is completed, the application layer indicates that the session is completed by sending an indication back to the RRC layer. This solution may be realized in two different variants. In a first variant, the withholding of the release command is done in the RRC layer in the RAN node (e.g., gNB), which sends the release command when an indication of completed measurement session is received from the UE. In a second variant, the RRC layer in the RAN node sends the release command to the RRC layer in the UE, which withholds the release command until it receives an indication from the application layer that the measurement session has ended.

In another solution, a session feedback indication is used by the network to assist the network to know when to stop QoE measurements. When a UE performs a handover to a cell that is outside a measurement area for QoE measurements, the network checks whether it has received a session feedback indication that a session has started. If so, the network forwards a "release pending" indication to a target gNB for the handover, which will release the QoE measurements when the UE has sent a stop indication that indicates that the ongoing QoE measurement is completed. If there is no ongoing session at the time of handover, the source gNB releases the QoE measurements at the handover, i.e., does not inform the target gNB that QoE measurement is configured.

In another scenario, a UE in connected mode may temporarily loose its connection in a cell controlled by a first RAN node within the measurement area configured for QoE measurements and very soon re-establishes to a new cell controlled by a second RAN node which is outside the configured measurement area. In this case, the second RAN node can try to fetch the UE Context from the last serving RAN node and obtain indication about "release pending" indication concerning the ongoing sessions for the UE.

In another embodiment, if a source RAN node, e.g., a source gNB, has received an indication from the UE that an application/measurement session has started (and is thus ongoing), the source RAN node sends an indication to the target RAN node, e.g., target gNB, that a session is ongoing, e.g., as part of the UE context information transferred to the target RAN node in the Handover Request XnAP/X2AP message and leaves to the target RAN node to handle the release of the measurement session. The source RAN node may do this regardless of whether the target cell is inside or outside the measurement area configured for the ongoing QoE measurement session. If the target cell is outside the configured measurement area, the target RAN node may send a release command to the RRC layer, which is withheld by the RRC layer until the measurement session is ended (as described above). Alternatively, the target RAN node may wait for an indication from the UE that the session has ended before the target RAN node sends a release command. If the target cell is within the measurement area configured for the ongoing QoE measurement, the target RAN node may keep note that a session is ongoing in the UE context. This indication of an ongoing session would then be used if the UE is handed over to yet another cell, where this cell is outside the configured measurement area. The indication of an ongoing session may then be forwarded to the new target RAN node (unless the target cell belongs to the same RAN node in which case the handling of the indication of the ongoing session is a node internal matter). Alternatively, if the UE is handed over (by the first target RAN node) to a new target cell (controlled by a second target RAN node) that is outside the measurement area configured for the ongoing QoE measurement, the first target RAN node (which is the source node in this second handover) may send a "release pending" indication to the second RAN node, as described above, e.g., in the Handover Request XnAP/X2AP message. In all these embodiment variants, the information transferred between a source RAN node and a target RAN node may also include the definition of the measurement area configured for the ongoing QoE measurement (e.g., to facilitate for the first and/or second target RAN node to determine if the UE is inside or outside the configured area as well as when the UE exits the configured area).

There are, proposed herein, various embodiments which address one or more of the issues disclosed herein. Certain embodiments may provide one or more of the following technical advantage(s). An advantage of the solution is that it ensures that the requirements for QoE measurements are fulfilled, also if the UE performs handover or re-establish its connection to a cell controlled by a node that is outside of the configured area.

Further details regarding the solutions and embodiments introduced above will now be provided.

1 Pending QoE Release Command Handled by the UE Layer

In a one solution, the RRC layer is aware of ongoing sessions (e.g., ongoing streaming sessions) at the application level via receiving an indication upon start or end of every session. The RRC layer controls when to release a QoE configuration. In one embodiment, the network (e.g., a network node) sends a release command in RRC signaling to the UE to release the QoE configuration. The RRC layer however does not release the QoE configuration right away, but sends a release command to the application layer to release the QoE configuration when the ongoing session of a target service of the QoE is completed. When the ongoing session is completed, the application layer indicates that the session is completed by sending an indication back to the RRC layer. The RRC layer also sends a confirmation of releasing the QoE configuration to the network node.

1.1 UE (RRC Layer) Side Embodiments

According to one embodiment, a method executed by a UE as well as a network node owning the serving cell of the UE may include receiving (e.g., at an RRC layer of the UE) an indication from an application upon start and end of every session, the indication indicating the start or end of a session. This means, in some embodiments, that (1) upon start of a session, the application sends a start indication to the RRC layer indicating the start of the session; (2) upon end of a session, the application sends an end indication to the RRC layer indication the end of the session; and (3) start and end indications can be sent when the QoE measurements are started or ended at applications. The method may also include storing the indications concerning the ongoing sessions in some variables at the UE side, e.g. in the RRC layer. The method may also include receiving an RRC message, e.g., RRCReconfiguration or RRCReestablishmentor RRCSetup, containing configuration of QoE measurements from a network node, e.g. gNB, when the UE is within an area of the QoE measurements. The method may also include transmitting a confirmation to the network that QoE measurements have been configured in RRCReconfigurationComplete or RRCReestablishmentComplete or RRCSetupComplete.

In the case of Handover, the method may include receiving a Handover Command, RRCReconfiguration, from the network node, where QoE measurements are not configured in the target cell. In such a case, the method may include receiving an indication from the network node to release at least one QoE configuration as part of the RRCReconfiguration message. This RRCReconfiguration message may include a handover or reconfiguration with sync command leading to a handover for the UE.

In the case of RRC connection re-establishment, the method may include receiving a RRCReestablishmentor RRCSetup from the network node, where QoE measurements are not configured in the target cell (i.e., the target cell is outside the area configured in a QoE measurement configuration in the UE). The method may also include receiving an indication from the network node to release at least one QoE configuration as part of the RRCReestablishmentor RRCSetup message.

The method may also include verifying if there are any ongoing sessions at application layer for the application subject to release the existing QoE configuration. Verification can be done, for example, by checking the internal variables including the indications concerning the ongoing sessions at application layer. For example, the activity on a bearer pertaining to the application session can be checked in order to verify session activity. In another embodiment, verification can be done by sending a request signal to the application, requesting the application to inform the RRC layer about any ongoing sessions.

If the RRC layer detects any ongoing sessions at application layer, the RRC layer avoids sending a release request/command to the application. In another embodiment, the RRC layer sends an AT command (herein referred to as the pending release request) requesting the application layer to release the measurement configuration for ongoing application(s) only after the corresponding session has ended.

In the Handover case, the method may include transmitting a confirmation for the Handover Command message, e.g., an RRCReconfigurationComplete, optionally including an indication that there is a pending release of QoE measurements. In the Re-establishment case, the method may include transmitting a configuration to the network, e.g. in RRCReestablishmentComplete or RRCSetupComplete, optionally including an indication that there is a pending release of QoE measurements.

If there are ongoing sessions in the application layer, the RRC layer waits until the ongoing sessions end and sends the release command when all the old sessions ended. In yet another embodiment, RRC layer may send the release command to the application upon receiving the release command from the network side and waits until it receives the confirmation from application indicating the release of the QoE configuration.

The method may also include receiving an indication from the application, upon releasing the QoE configuration, indicating that the QoE configuration is released. The method may also include sending an indication to the network upon sending the release command to the application, or upon receiving the release confirmation from the application, confirming that QoE configuration is released. This indication can be sent to the network node via an existing RRC message or a dedicated signal to the QoE solution. In another embodiment, RRC layer sends the indication, indicating the release of the QoE configuration to the network node, upon receiving an indication from the application indicating the release of the QoE configuration.

Figure 9A:
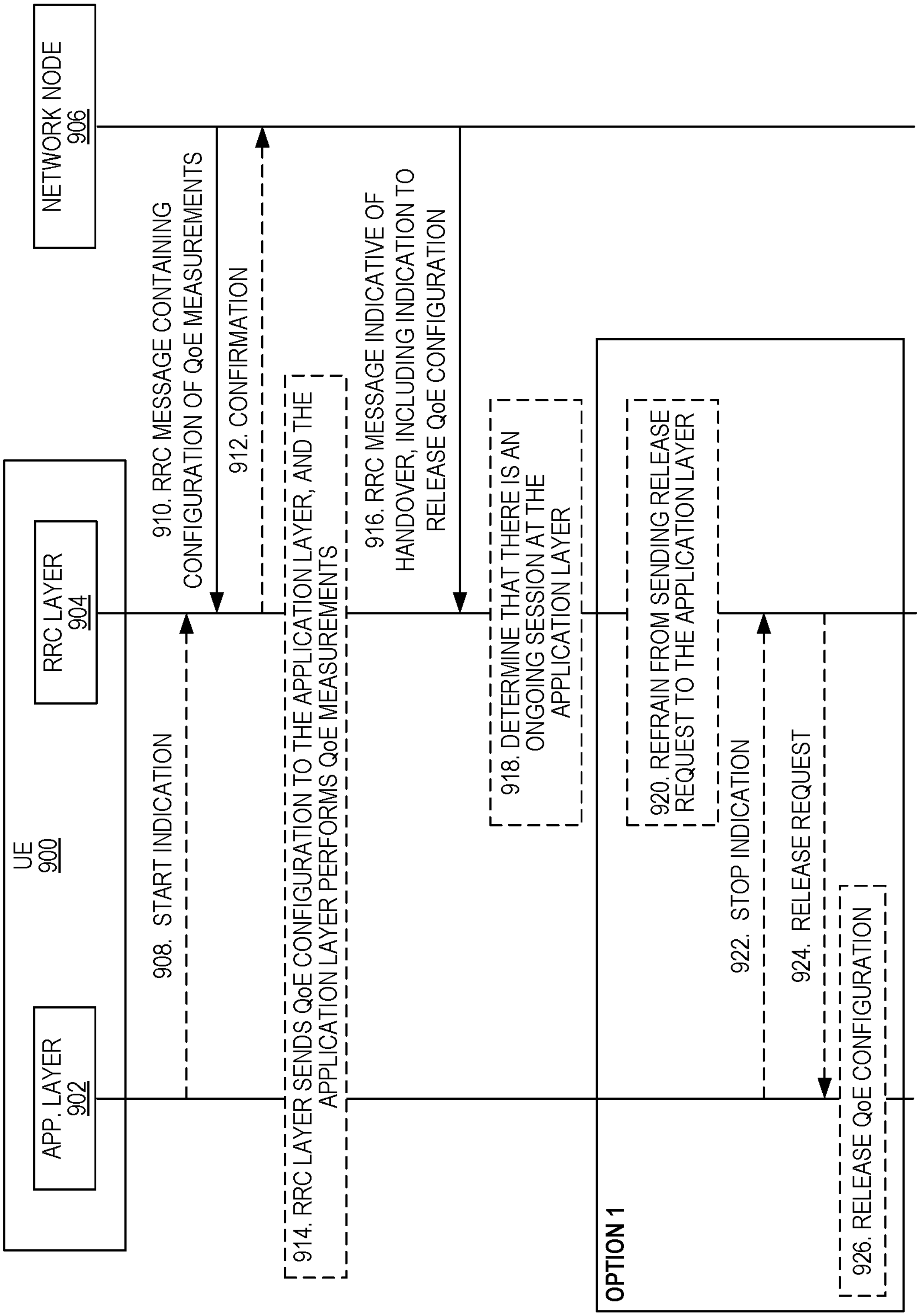
FIGS. 9A and 9B illustrate the operation of a UE and a network node to delay Quality of Experience (QoE) measurement configuration release until an associated session has ended in accordance with first embodiments of the present disclosure.
Figure 9B:
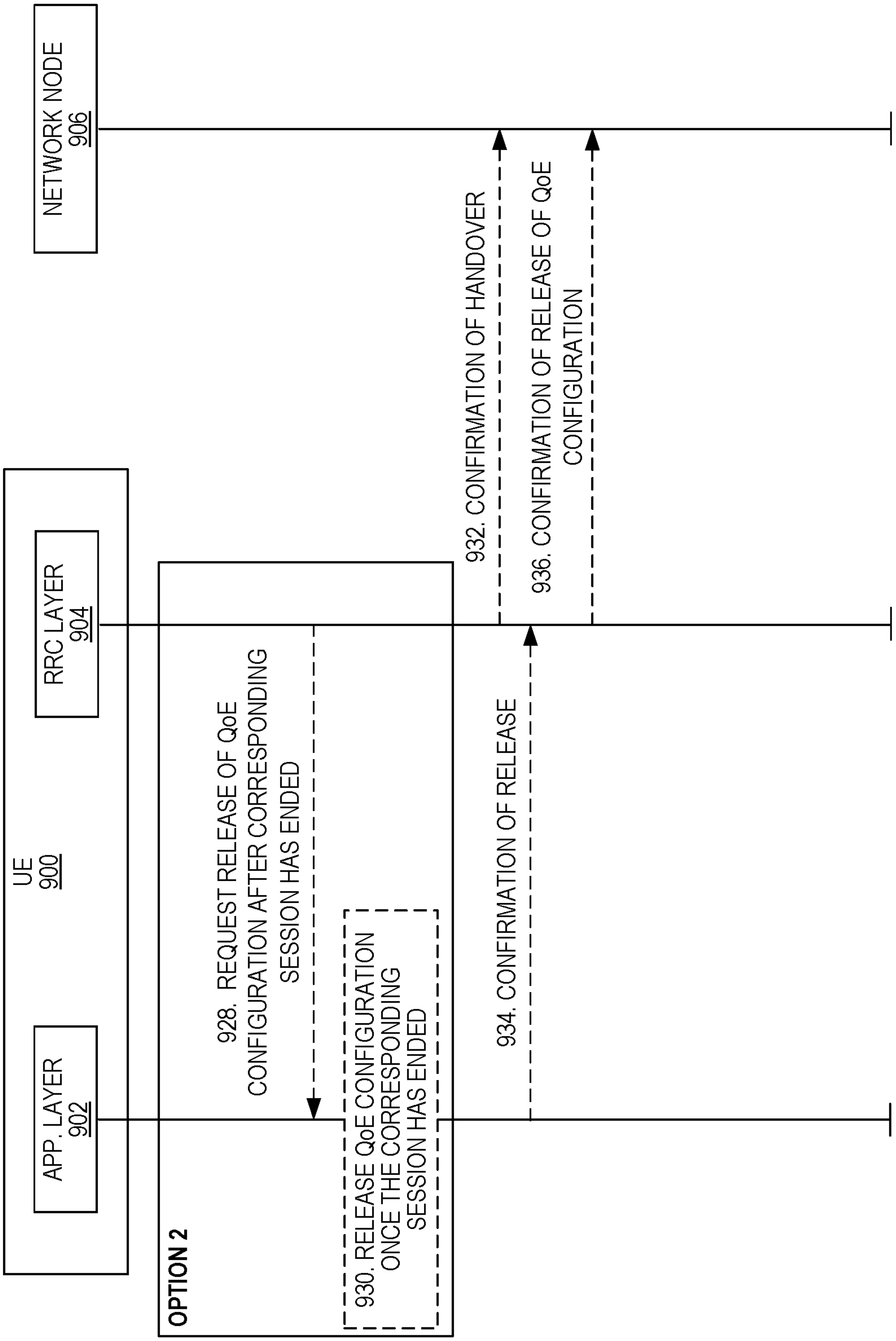

FIG. 9 illustrates the operation of a UE 900, including an application layer 902 and an RRC layer 904, and a network node in accordance with at least some of the UE-side embodiments described above. Optional steps are represented by dashed lines. As illustrated, the application layer 902 (i.e., the application) sends a start indication to the RRC layer 904 indicating that a session has started (step 908). The RRC layer 904 also receives, from the network node 906, an RRC message that contain configuration of QoE measurements (i.e., a QoE configuration) (step 910). The RRC layer 904 may respond to the network node 906 with a confirmation message (step 912). The RRC layer 904 provides the QoE configuration to the application layer 902, where the application layer 902 performs QoE measurements in association with the respective session in accordance with the QoE configuration (step 914).

In this example, while the UE 900 is configured with the QoE configuration for QoE measurements, the RRC layer 904 receives an RRC message from the network node 906 that is indicative of handover (step 916). As discussed above, this RRC message may be an RRCReconfiguration message, and RRCReestablishment message, or an RRCSetup message. The RRC message includes an indication to release the QoE configuration. The RRC layer 904 verifies whether there is an ongoing session associated to the QoE configuration and, in this example, determines that there is an ongoing session at the application layer 902 (step 918). Then, in one option ("Option 1"), the RRC layer 904 refrains from sending a release request for the QoE configuration to the application layer (step 920) util the RRC layer 904 receives a stop indication from the application layer 902 indicating that the session has ended (step 922). Responsive thereto, the RRC layer (step 904) sends a release request to the application 902 that requests release of the QoE configuration (step 924). In response, the application layer 902 release the QoE configuration (step 926). Alternatively, in another option ("Option 2"), the RRC layer 904 sends a request to the application layer 902 to release the QoE configuration once the corresponding session has ended (step 928). The application layer 902 then release the QoE configuration once the corresponding session has ended (step 926).

The RRC layer 902 may sends a confirmation of handover, e.g., an RRCReconfigurationComplete, an RRCReestablishmentComplete, or RRCSetupComplete (step 932). If this confirmation is sent prior to release of the QoE configuration, this confirmation may optionally include an indication that there is a pending release of QoE measurements. Once the QoE configuration is released, the application layer 902 may send a confirmation of release to the RRC layer 904 (step 934), and the RRC layer 904 may send a configuration of release to the network node 906 (step 936).

1.2 Network Side Embodiments

According to one embodiment, the network node (e.g., network node 906) keeps the QoE configuration as part of UE context at least until receiving the confirmation of QoE configuration release from the UE RRC layer (e.g., RRC layer 904, e.g., in step 936). The network node may decide to keep the QoE configuration for some extra time more compared to the arrival of such confirmation. In this manner, it becomes easier for the network node to keep ongoing QoE measurement sessions for UEs toggling at the border of the area scope.

According to another embodiment, the network releases the QoE configuration from its memory when it receives the confirmation signal from the RRC layer indicating that application has released the QoE configuration, optionally after keeping the QoE configuration for some time as described above.

Figure 10:
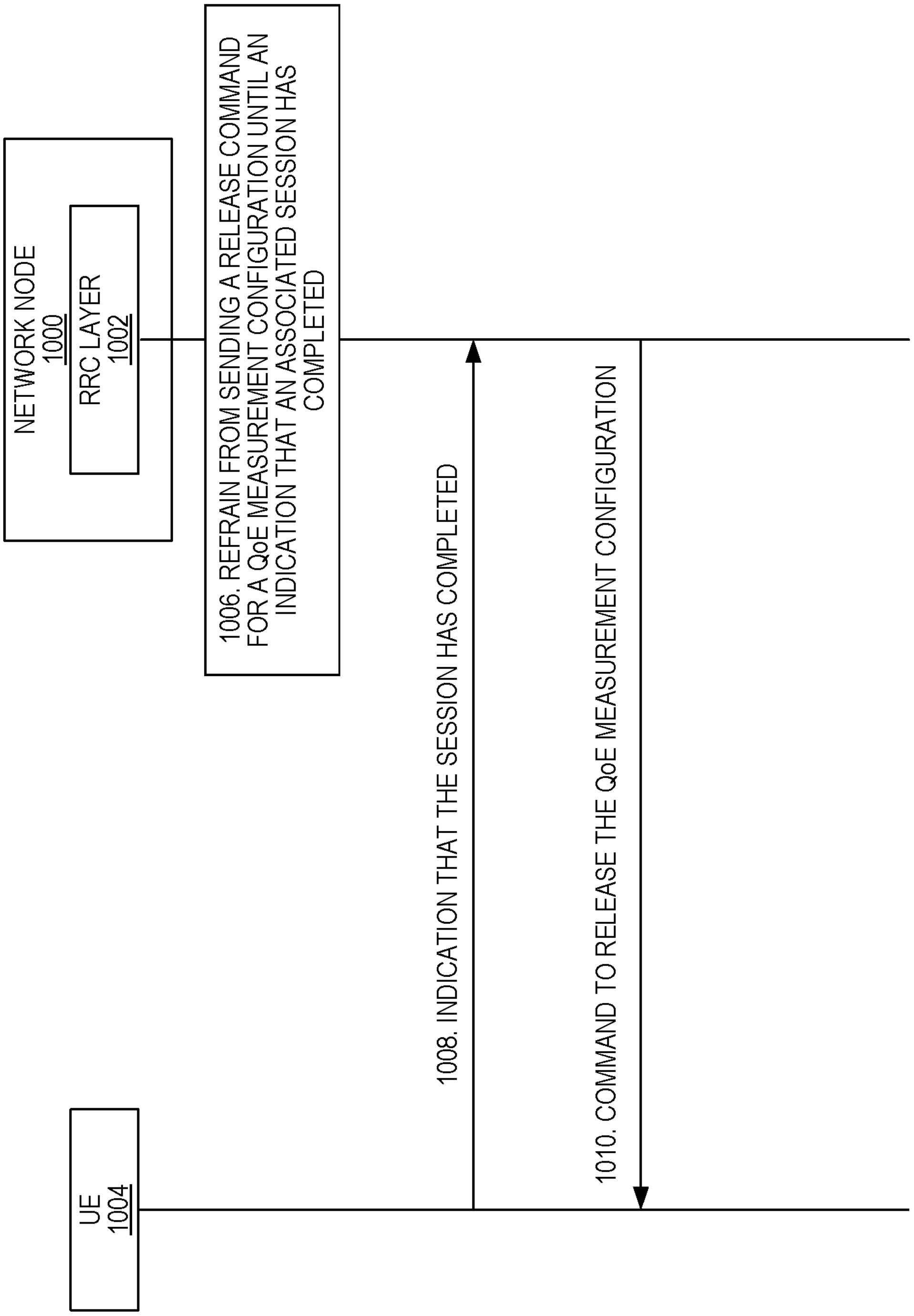
FIG. 10 illustrates the operation of a UE and a network node to delay QoE measurement configuration release until an associated session has ended in accordance with another embodiment of the present disclosure.

As described above, in one solution, the network sends a release command to release QoE measurements. The RRC layer however does not release the measurements right away, but sends a release command to the application layer to release the measurements when the session is completed. When the session is completed, the application layer indicates that the session is completed by sending an indication back to the RRC layer. In one variant, the withholding of the release command is done in the RRC layer in the RAN node (e.g., gNB), which sends the release command when an indication of completed measurement session is received from the UE. This is illustrated in FIG. 10, where a network node 1000, and in particular an RRC layer 1002 of the network node 1000, refrains from sending a command to release a QoE measurement configuration to a UE 1004 until receiving an indication from the UE 1004 that a session associated to the measurement configuration has completed (step 1006). The RRC layer 1002 of the network node 1000 receives an indication from the UE 1004 that the session associated to the QoE measurement configuration has completed (step 1008). Responsive to receiving this indication, the RRC layer of the network node 1000 sends, to the UE 1004, a command to release the QoE measurement configuration (step 1010).

2 Pending QoE Release Command Handled by the Network

In another solution, a session feedback indication is used by the network to assist the network to know when to stop QoE measurements. When the UE performs a handover to a cell which is outside the measurement area configured for QoE measurement, the network checks whether it has received a session feedback indication that a session has started (but not a subsequent indication that the session has ended). If so, the network sends a "release pending" indication to a target gNB if a handover is executed for the concerned UE, where the target gNB will release the measurements when the UE has sent a stop indication that the ongoing session is completed. If there is no ongoing session at the time of handover, the source gNB releases the measurements at the handover, i.e. does not inform target gNB that QoE is configured.

Alternatively, the source gNB does not release the QoE measurement configuration, but indicates its presence as well as the configured associated measurement area, to the target gNB. This way, the QoE measurement configuration may be kept and used in case the UE would re-enter the configured measurement area. As one option, the source or target gNB may send a "suspend" command to the UE, indicating that the QoE measurement configuration is suspended (optionally indicating that the cause is that the UE has left the configured area). If the UE later re-enters the configured area, the gNB (which may be the same or a different gNB) sends a "resume" command to the UE so that the suspended QoE measurement is resumed/reactivated. Information about a suspended QoE measurement configuration may be passed on to other gNBs during handovers. As another option, the target gNB may choose to release the QoE measurement configuration, instead of suspending it, optionally using a conditional release command which will be executed in the UE when the application/QoE measurement session has ended.

As another option, neither the source gNB nor the target gNB sends any "suspend" command to the UE when the UE leaves the configured area (unless there is a QoE measurement session ongoing in the UE). But if the gNB (i.e., the gNB which is the UE's serving gNB after the handover) receives an indication from the UE (which is now outside the configured area) that an application/QoE measurement session has started, then the gNB sends a "suspend" command (or alternatively a "release" command) to the UE, so that the UE suspends (or releases) the QoE configuration (and thus the QoE measurement).

Figure 11A:
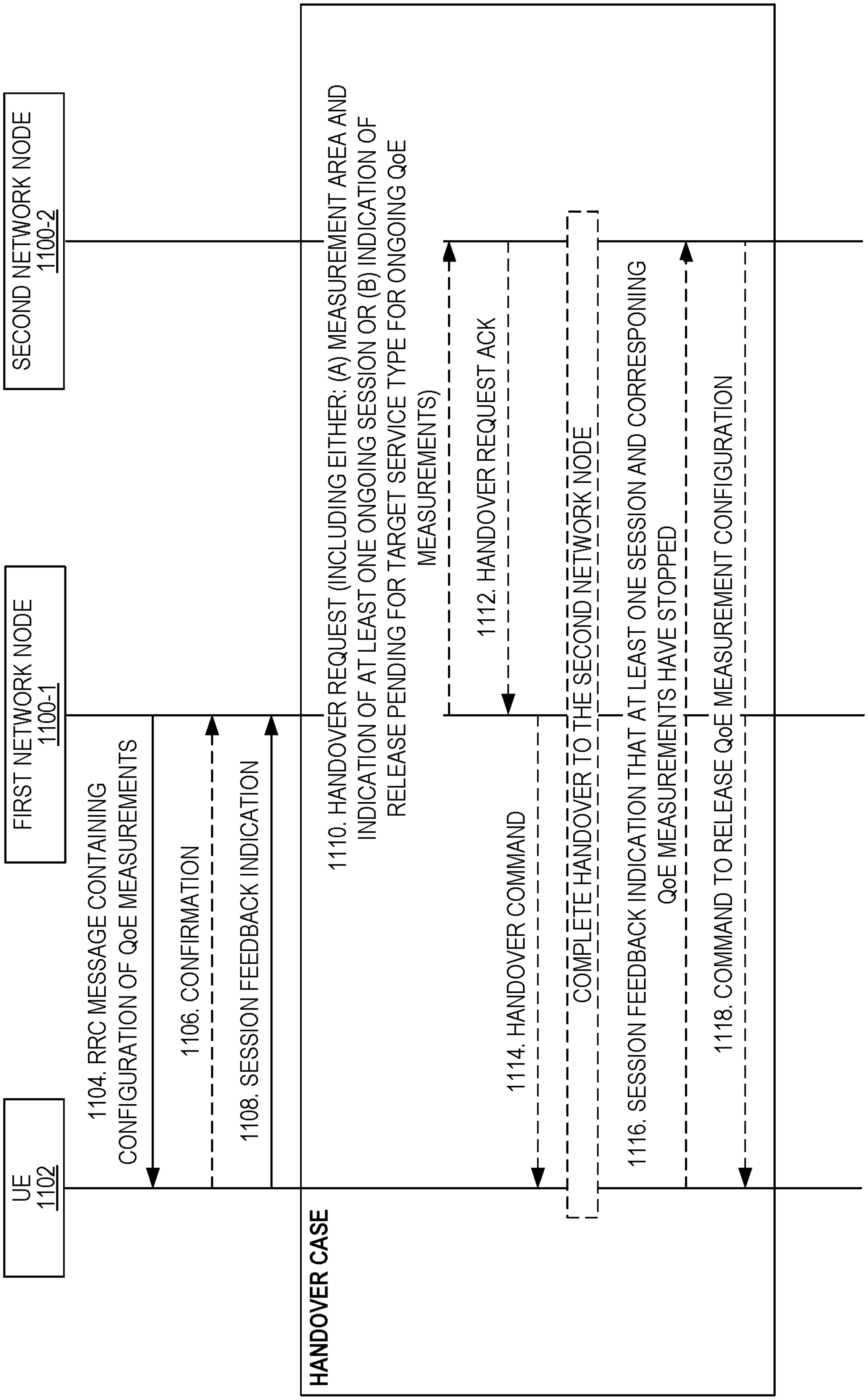
FIGS. 11A and 11B illustrate the operation of a UE and first and second network nodes in relation to QoE measurement configuration release in association with a handover and in association with a RRC connection re-establishment, in accordance with further embodiments of the present disclosure.
Figure 11B:
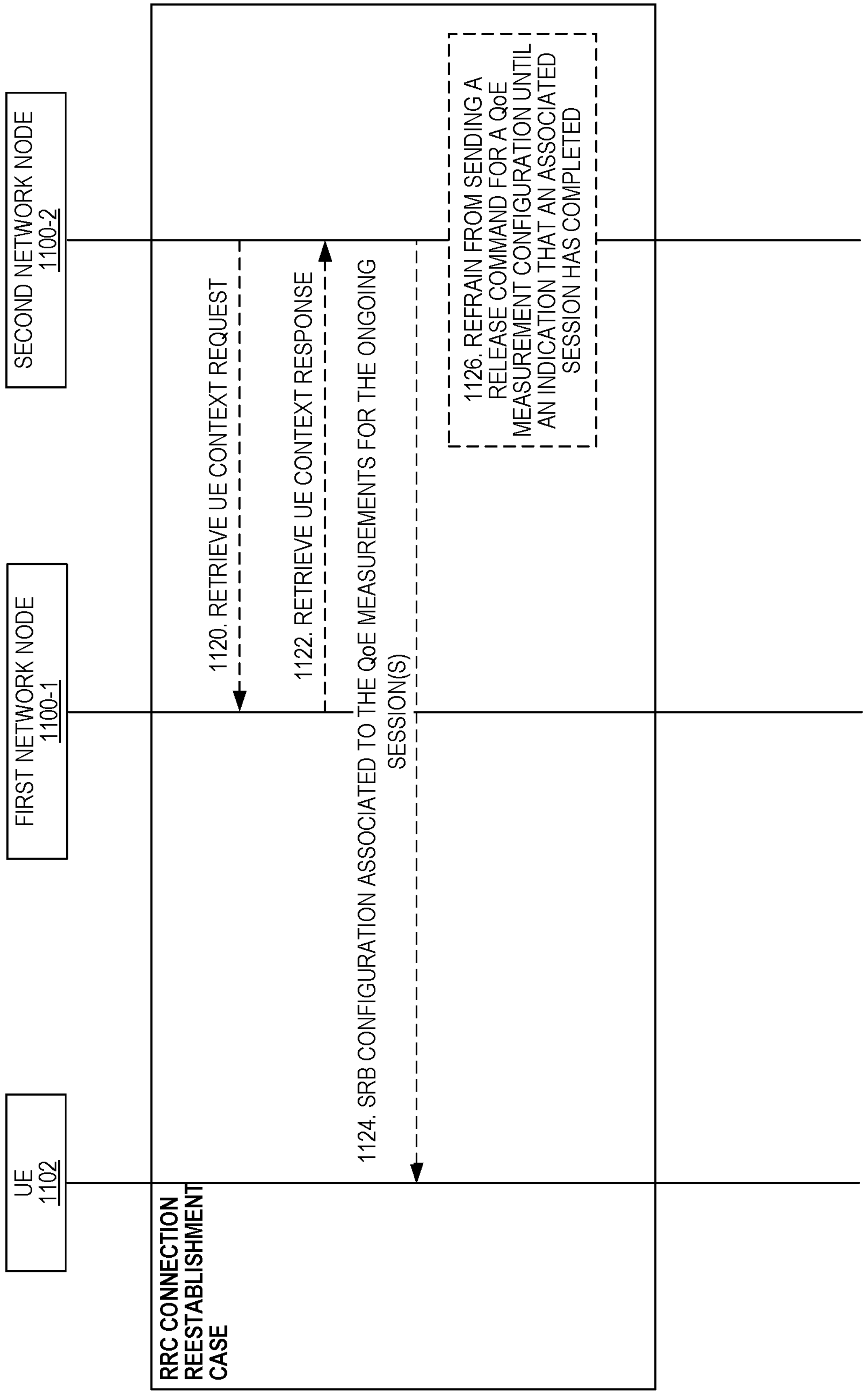

As illustrated in FIGS. 11A and 11B, according to one embodiment, a method executed by a network node, e.g., a gNB, or gNB-CU, or IAB donor CU, herein referred to as the first network node 1100-1, includes transmitting from the first network node 1100-1 an RRC message, e.g., RRCReconfiguration, containing configuration of QoE measurements to a UE 1102, when the UE is within an area of the QoE measurements (step 1104), and transmitting a confirmation from the UE 1102 to the first network node 1100-1 that QoE measurements have been configured in RRCReconfigurationComplete (step 1106). The method may also include receiving at the first network node 1100-1 a session feedback indication from the UE 1102 that at least one session and corresponding QoE measurements have started (step 1108).

In the case of Handover, the method may also include transmitting, to another gNB, herein referred to as the second network node 1100-2 (owning the target cell, outside the area), a HANDOVER REQUEST, for the UE 1000, to a cell outside the area of QoE measurements (step 1110). The HANDOVER REQUEST includes the area of the QoE measurements and an indication indicating at least one ongoing session or alternatively a release pending indication for the target service type for ongoing QoE measurements. In the case of Handover, the method may also include receiving at the first network node 1100-1, from the second network node 1100-2 owning the target cell outside the area, a HANDOVER REQUEST ACKNOWLEDGE message including the Handover Command including SRB configuration associated to the QoE measurements for ongoing sessions (step 1112). In this case, the second network node 1100-2 owning the target cell would not send the release command to release the ongoing QoE configuration. In the case of Handover, the method may include transmitting, from the first network node 1100-1, a Handover Command to the UE 1102 with QoE measurements and SRB configuration associated to the QoE measurements (step 1114).

The method may also include receiving, after the handover, at the second network node 1100-2, a session feedback indication that at least one session and corresponding QoE measurements have stopped (step 1116), and transmitting, from the second network node 1100-2, a command to the UE 1102, e.g. in RRCReconfiguration, to release (deconfigure) the ongoing QoE measurements, if the measurements have stopped and if the UE is still outside the area (step 1118).

In case the session(s) is still ongoing when the UE is being handed over from the second network node 1100-2 to a third network node (not shown), the second network node 1100-2 includes in the HANDOVER REQUEST to the third network node the "release pending" indication i.e., an indication that at the QoE measurements should be released when the ongoing session has ended. If, at a later time, the UE 1102 is being handed over from the second network node 1100-2 back to the first network node 1100-1 (into a cell of the first network node 1100-1 that is inside the measurement area), where the session(s) is still ongoing, the RRC layer of the UE 1102 may send an AT command to the application layer in order to recall the previously issued conditional release of measurement configuration (defined above in Section 1 of the Detailed Description).

In case of RRC connection re-establishment (the first network node being the last serving node before the RRC Re-establishment), the method may include receiving from the second network node a RETRIEVE UE CONTEXT REQUEST message to retrieve the UE Context from the last serving gNB (i.e., the first network node 1100-1 in this example (step 1120) and transmitting, to the second network node 1100-2, a RETRIEVE UE CONTEST RESPONSE message with the UE context for the UE 1102 to be re-established (step 1122). The UE 1102 receives, from the second network node 1100-2 (i.e., the target network node owning the target cell), the SRB configuration associated to the QoE measurements for ongoing sessions (step 1124). In this case, the second network node 1100-2 owning the target cell would not send the release command to release the ongoing QoE configuration (step 1126). In other words, the second network node 1100-2 refrains from sending a command to release the QoE measurement configuration until it receives an indication from the UE (1102) that the session associated to the QoE measurement configuration has ended (and the UE 1102 is not in the measurement area).

3 Feedback Indication from the Application Layer after Handover

In another embodiment, the source RAN node (e.g., source gNB) does not send any pending release to the UE nor to the target RAN node (target gNB), but if an application/QoE measurement session is ongoing, the UE (always) sends a feedback notification to the target RAN node (i.e., the new RAN node) after (or in conjunction with) a handover to a new cell (e.g., using the message confirming handover completion, e.g., the RRCReconfigurationComplete message). To indicate that an application/QoE measurement session is ongoing, the UE can either send an "ongoing" indication or reuse the "start" indication to the new RAN node. The area scope configuration is transferred from the source RAN node to the target RAN node, e.g., together with the other UE contextual data in the Handover Request XnAP/X2AP message, so that the target/new RAN node can determine whether the UE is still in the configured area or has left it and in the latter case the new RAN node will send a "release" command to the UE when it receives an "QoE session stopped" feedback indication.

4 Additional Explanation Section 4: Example Implementation

A. TS 38.331. One nonlimiting example of the method proposed in Additional Explanation Section 1 can be implemented as part of RRC specification TS 38.331 as following. Effective changes are shown in the bold, underlined text.

Modified TS 38.331

5.3.10.9 Other configuration

The UE shall:

1> if the received otherConfig includes the reportProximityConfig:

2> if proximityIndicationEUTRA is set to enabled:

3> consider itself to be configured to provide proximity indications for E-UTRA frequencies in accordance with 5.3.14;

2> else:

3> consider itself not to be configured to provide proximity indications for E-UTRA frequencies;

2> if proximityIndicationUTRA is set to enabled:

3> consider itself to be configured to provide proximity indications for UTRA frequencies in accordance with 5.3.14;

2> else:

3> consider itself not to be configured to provide proximity indications for UTRA frequencies;

1> if the received otherConfig includes the obtainLocation:

2> attempt to have detailed location information available for any subsequent measurement report;

NOTE 1: The UE is requested to attempt to have valid detailed location information available whenever sending a measurement report for which it is configured to include available detailed location information. The UE may not succeed e.g. because the user manually disabled the GPS hardware, due to no/poor satellite coverage. Further details, e.g. regarding when to activate GNSS, are up to UE implementation.

1> if the received otherConfig includes the bt-NameListConfig:

2> if bt-NameListConfig is set to setup, attempt to have Bluetooth measurement results available for subsequent measurement report;

1> if the received otherConfig includes the wlan-NameListConfig:

2> if wlan-NameListConfig is set to setup, attempt to have WLAN measurement results available for subsequent measurement report;

NOTE 2: The UE is requested to attempt to have valid Bluetooth measurements and WLAN measurements whenever sending a measurement report for which it is configured to include these measurements. The UE may not succeed e.g. because the user manually disabled the WLAN or Bluetooth hardware. Further details, e.g. regarding when to activate WLAN or Bluetooth, are up to UE implementation.

1> if the received otherConfig includes the idc-Config:

2> if idc-Indication is included (i.e. set to setup):

3> consider itself to be configured to provide IDC indications in accordance with 5.6.9;

3> if idc-Indication-UL-CA is included (i.e. set to setup):

4> consider itself to be configured to indicate UL CA related information in IDC indications in accordance with 5.6.9;

3> if idc-HarwareSharingIndication is included (i.e. set to setup):

4> consider itself to be configured to indicate IDC hardware sharing problem indications in IDC indications in accordance with 5.6.9;

3> if idc-Indication-MRDC is included (i.e. set to setup):

4> consider itself to be configured to provide IDC indications for MRDC in accordance with 5.6.9;

2> else:

3> consider itself not to be configured to provide IDC indications;

2> if autonomousDenialParameters is included:

3> consider itself to be allowed to deny any transmission in a particular UL subframe if during the number of subframes indicated by autonomousDenialValidity, preceeding and including this particular subframe, it autonomously denied fewer UL subframes than indicated by autonomousDenialSubframes;

2> else:

3> consider itself not to be allowed to deny any UL transmission;

1> if the received otherConfig includes the powerPrefIndicationConfig:

2> if powerPrefIndicationConfig is set to setup:

3> consider itself to be configured to provide power preference indications in accordance with 5.6.10;

2> else:

3> consider itself not to be configured to provide power preference indications;

1> if the received otherConfig includes the sps-AssistanceInfoReport

2> if sps-AssistanceInfoReport is set to TRUE:

3> consider itself to be configured to provide SPS assistance information in accordance with 5.6.10;

2> else

3> consider itself not to be configured to provide SPS assistance information;

1> if the received otherConfig includes the bw-PreferenceIndicationTimer

2> consider itself to be configured to provide maximum PDSCH/PUSCH bandwidth preference indication in accordance with 5.6.10;

1> else:

2> consider itself not to be configured to provide maximum PDSCH/PUSCH bandwidth indication preference;

1> if the received otherConfig includes the delayBudgetReportingConfig:

2> if delayBudgetReportingConfig is set to setup:

3> consider itself to be configured to send delay budget reports in accordance with 5.6.10;

2> else:

3> consider itself not to be configured to send delay budget reports and stop timer T342, if running;

1> if the received otherConfig includes the overheatingAssistanceConfig:

2> if overheatingAssistanceConfig is set to setup:

3> consider itself to be configured to provide overheating assistance information in accordance with 5.6.10;

2> else:

3> consider itself not to be configured to provide overheating assistance information and stop timer T345, if running;

1> for BL UEs or UEs in CE, if the received otherConfig includes the rlm-ReportConfig:

2> if rlm-ReportConfig is set to setup:

3> consider itself to be configured to detect "early-out-of-sync" and "early-in-sync" RLM events as specified in 5.3.11;

3> if rlmReportRep-MPDCCH is set to setup:

4> consider itself to be configured to report rlmReportRep-MPDCCH in accordance with 5.6.10;

2> else:

3> consider itself not to be configured to detect "early-out-of-sync" and "early-in-sync" RLM events and stop timer T343, timer T344, timer T314 and timer T315 if running;

1> if the received otherConfig includes the measConfigAppLayer

2> if measConfigAppLayer is set to setup:

3> forward measConfigAppLayerContainer to upper layers considering the serviceType;

3> consider itself to be configured to send application layer measurement report in accordance with 5.6.19;

2> else if there is no ongoing session at application and UE received a *release* command 3> inform upper layers to clear the stored application layer measurement configuration;

3> discard received application layer measurement report information from upper layers;

3> consider itself not to be configured to send application layer measurement report.

5.6.19 Application layer measurement reporting 5.6.19.1 General

[REPRODUCED HEREIN AS FIG. 8]

Figure 5:
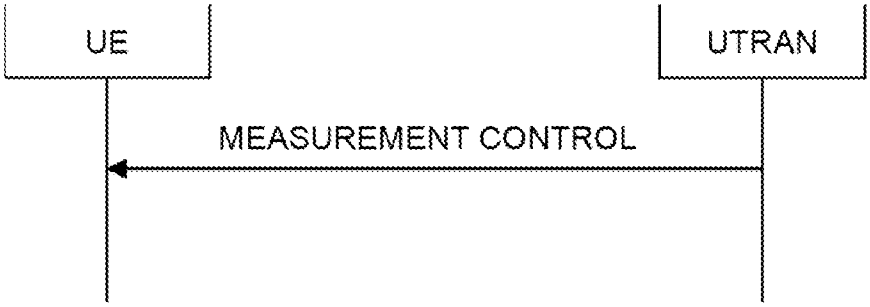
FIG. 5 illustrates the Measurement Control RRC message as defined in 3GPP.
Figure 6:
FIG. 6 illustrates the Measurement Report RRC message as defined in 3GPP.
Figure 7:
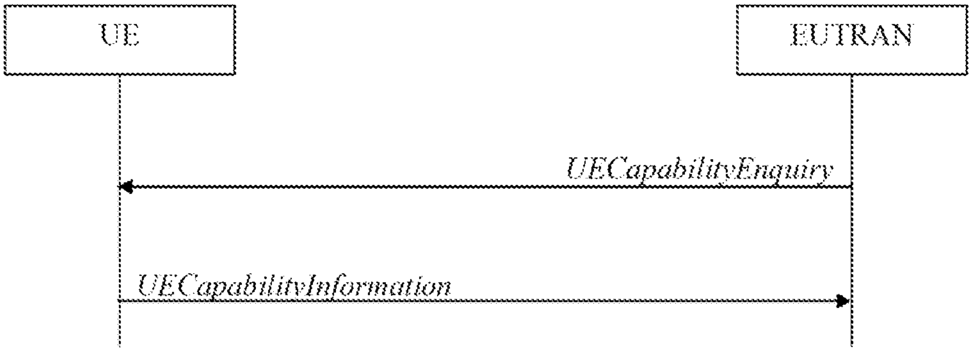
FIG. 7 illustrates the UE Capability Enquiry and the UE Capability Information response as defined in 3GPP.
Figure 8:
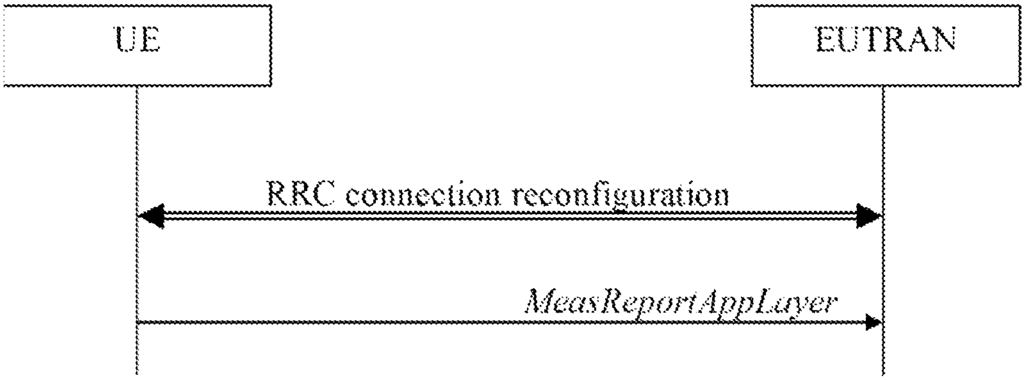
FIG. 8 illustrate the application layer measurement reporting procedure described in 3GPP TS 36.331.

FIG. 5.6.19.1-1: Application layer measurement reporting

The purpose of this procedure is to inform E-UTRAN about application layer measurement report.

5.6.19.2 Initiation

A UE capable of application layer measurement reporting in RRC_CONNECTED may initiate the procedure when configured with application layer measurement, i.e. when measConfigAppLayer has been configured by E-UTRAN.

Upon initiating the procedure, the UE shall:

1> if configured with application layer measurement, and SRB4 is configured, and the UE has received application layer measurement report information from upper layers:

2> set the measReportAppLayerContainer in the MeasReportAppLayer message to the value of the application layer measurement report information;

2> set the serviceType in the MeasReportAppLayer message to the type of the application layer measurement report information;

2> submit the MeasReportAppLayer message to lower layers for transmission via SRB4.

1> If the UE receives a QoE release indication from the application

2> Sets the *qoeConfigRelease* to *true*

2> submit the *MeasReportAppLayer* message to lower layers for transmission via SRB4.

MeasReportAppLayer

The MeasReportAppLayer message is used for sending application layer measurement report.

Signalling radio bearer: SRB4

RLC-SAP: AM

Logical channel: DCCH

Direction: UE to E-UTRAN

```
-- ASN1START
MeasReportAppLayer-r17 ::=      SEQUENCE {
  criticalExtensions                      CHOICE {
  {
  measReportAppLayer-r17                  MeasReportAppLayer-r15-IEs,
  service Type-r17              ENUMERATED {qoe, qoemtsi, spare6,
spare5, spare4, spare3, spare2, spare1}  OPTIONAL,
  }
  {
  qoeConfigRelease              ENUMERATED {true,...}
  }
}
}
-- ASN1STOP
```

MeasReportAppLayer Message

End Modified TS 38.331

B. TS 38.423. One nonlimiting example of the method proposed in Additional Explanation Section 2 can be implemented over Xn interface TS 38.423 as follows (new additions are shown by bold, underlined text). The example implementation uses TS 36.423 baseline text, as QoE measurements do not exist in NR specifications yet.

Modified TS 38.423

9.2.xxx UE Application layer measurement configuration

The IE defines configuration information for the QoE Measurement Collection (QMC) function.

| IE/Group Name | Presence | Range | IE type and reference | Semantics description | Criticality | Assigned Criticality |
|---|---|---|---|---|---|---|
| Container for application layer measurement configuration | M | | Octet string (1 . . . 1000) | Indicates application layer measurement configuration, see Annex L in [36]. | — | |
| CHOICE Area Scope of QMC | M | | | | — | |
| >Cell based | | | | | | |
| **>>Cell ID List for QMC** | | 1 . . . <maxnoofCellIDforQMC> | | | | |
| >>>E-CGI | M | | 9.2.1.38 | | — | |
| >TA based | | | | | | |
| **>>TA List for QMC** | | 1 . . . <maxnoofTAforQMC> | | | | |

-continued

| IE/Group Name | Presence | Range | IE type and reference | Semantics description | Criticality | Assigned Criticality |
|---|---|---|---|---|---|---|
| >>>TAC | M | | 9.2.3.7 | The TAI is derived using the current serving PLMN. | — | |
| >TAI based | | | | | | |
| **>>TAI List for QMC** | | 1 . . . <maxnoofTAforQMC> | | | — | |
| >>>TAI | M | | 9.2.3.16 | | — | |
| >PLMN area based | | | | | | |
| **>>PLMN List for QMC** | | 1 . . . <maxnoofPLMNforQMC> | | | | |
| >>>PLMN Identity | M | | 9.2.3.8 | | — | |
| Service Type | M | | ENUMERATED (QMC for streaming service, QMC for MTSI service, . . . ) | This IE indicates the service type of UE application layer measurements. | — | |
| **Ongoing Session** | **M** | | **ENUMERATED (true,. . . )** | **This IE indicated if there is an ongoing session at application** | | |
| **Ongoing QoE measurement** | **M** | | **ENUMERATED (true, . . . )** | **This IE indicated if there is an ongoing measurement at application** | | |

End Modified TS 38.423

C. Re-establishment Case Xn interface TS 38.423. Another non limiting example of the method proposed for the Re-establishment case can be implemented over Xn interface TS 38.423 as following (new additions are shown by bold, underlined text).

Modified TS 38.423

9.1.1.9 RETRIEVE UE CONTEXT RESPONSE

This message is sent by the old NG-RAN node to transfer the UE context to the new NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| New NG-RAN node UE XnAP ID reference | M | | NG-RAN node UE XnAP ID 9.2.3.16 | Allocated at the new NG-RAN node | YES | ignore |
| Old NG-RAN node UE XnAP ID reference | M | | NG-RAN node UE XnAP ID 9.2.3.16 | Allocated at the old NG-RAN node | YES | ignore |
| GUAMI | M | | 9.2.3.24 | | YES | reject |
| UE Context Information - Retrieve UE Context Response | M | | 9.2.1.13 | | YES | reject |
| Trace Activation | O | | 9.2.3.55 | | YES | ignore |
| Masked IMEISV | O | | 9.2.3.32 | | YES | ignore |
| Location Reporting Information | O | | 9.2.3.47 | Includes the necessary parameters for location reporting. | YES | ignore |
| Criticality Diagnostics | O | | 9.2.3.3 | | YES | ignore |
| NR V2X Services Authorized | O | | 9.2.3.105 | | YES | ignore |
| LTE V2X Services Authorized | O | | 9.2.3.106 | | YES | ignore |

-continued

| | | | | | |
|---|---|---|---|---|---|
| PC5 QoS Parameters | O | 9.2.3.109 | This IE applies only if the UE is authorized for NR V2X services. | YES | ignore |
| UE History Information | O | 9.2.3.64 | | YES | ignore |
| UE History Information from the UE | O | 9.2.3.110 | | YES | ignore |
| Management Based MDT PLMN List | O | MDT PLMN List 9.2.3.133 | | YES | Ignore |
| **UE Application layer measurement configuration** | **O** | **9.2.xxx (see example above)** | | **YES** | **Ignore** |

| Range bound | Explanation |
|---|---|
| maxnoofMDTPLMNs | PLMNs in the Management Based MDT PLMN list. Value is 16. |

End Modified TS 38.423

D. AT command example implementation. The TS 27.007 implementation of AT command by means which the RRC layer instructs the application layer to release the measurement configuration as soon as the session is over or to recall such previously issued indication (conditional release, as described in Additional Explanation Section 1) may look as follows (new additions are shown by bold, underlined text).

Modified TS 27.007

8.78 Application Level Measurement Configuration+CAPPLEVMC Table 8.78-1: +CAPPLEVMC Parameter Command Syntax

TABLE 8.78-1

+CAPPLEVMC parameter command syntax

| Command | Possible response(s) |
|---|---|
| +CAPPLEVMC = [<n>] | +CME ERROR: <err> |
| +CAPPLEVMC? | +CAPPLEVMC: <n> |
| +CAPPLEVMC = ? | +CAPPLEVMC: (list of supported <n>s) |

Description

This command allows control of the application level measurement configuration according to 3GPP TS 25.331 and 3GPP TS 36.331 [86]. The set command controls the presentation of the unsolicited result code +CAPPLEVMC: <app-meas_service_type>, <start-stop_reporting>[, <app-meas_config_file_length>, <app-meas_config-file>] providing data for the configuration. Refer subclause 9.2 for possible <err> values.

Read command returns the current value of <n>.

Test command returns values supported as a compound value.

Defined values

<n>: integer type. Disable and enable presentation of the unsolicited result code +CAPPLEVMC to the TE.

0 Disable presentation of the unsolicited result code

1 Enable presentation of the unsolicited result code

<app—meas_service_type>: integer type. Contains the indication of what application that is target for the application level measurement configuration.

1 QoE measurement collection for streaming services

2 QoE measurement collection for MTSI services

<start-stop_reporting>: integer type. Indicates the start and stop of the application level measurement reporting for the application indicated by the <app-meas_service_ type>.

0 start the application level measurement reporting 1 stop the application level measurement reporting <app-meas_config_file_length>: integer type. Indicates the number of octets of the <app-meas_config-file> parameter.

<app-meas_config-file>: string of octets. Contains the application level measurement configuration file for the application indicated by the <app-meas_service_type>. The parameter shall not be subject to conventional character conversion as per +CSCS.

<app-meas_cond-meas-release>: integer type. Contains an indication of whether measurements for the indicated service type shall stop as soon as the session ends, or whether such previously issued command shall be released.

0 recall the previously issued conditional measurement configuration release command.

1 release the measurement configuration when the session ends.

End Modified TS 27.007

5 Example Systems

Figure 12:
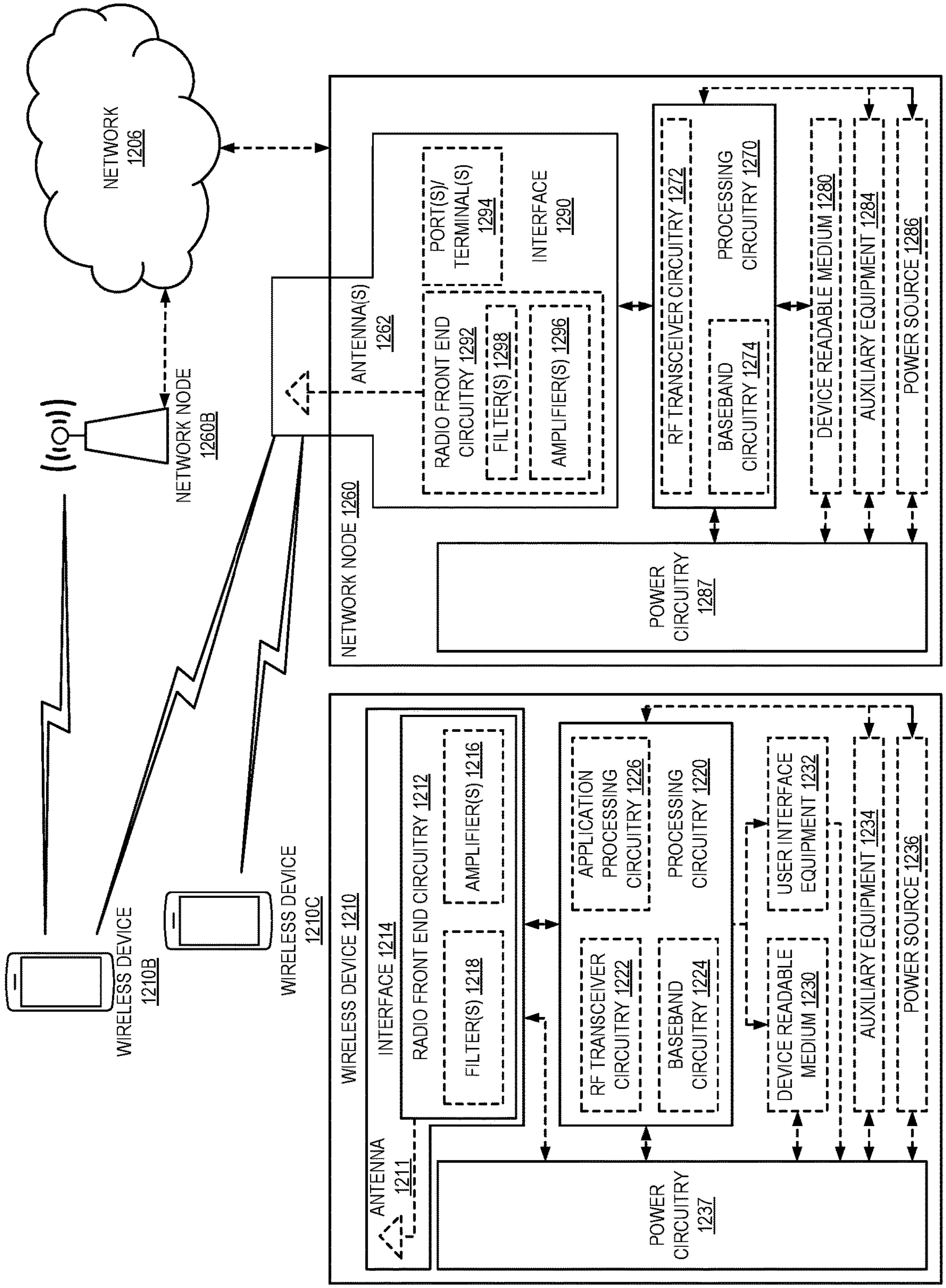
FIG. 12 illustrates one example of a wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260*b*, and WDs 1210, 1210*b*, and 1210*c*. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR Node Bs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a Node B component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple Node Bs. In such a scenario, each unique Node B and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, output interfaces, devices, and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236.

Power circuitry 1237 may perform any formatting, converting, or other modification to the power from power source 1236 to make the power suitable for the respective components of WD 1210 to which power is supplied.

Figure 13:
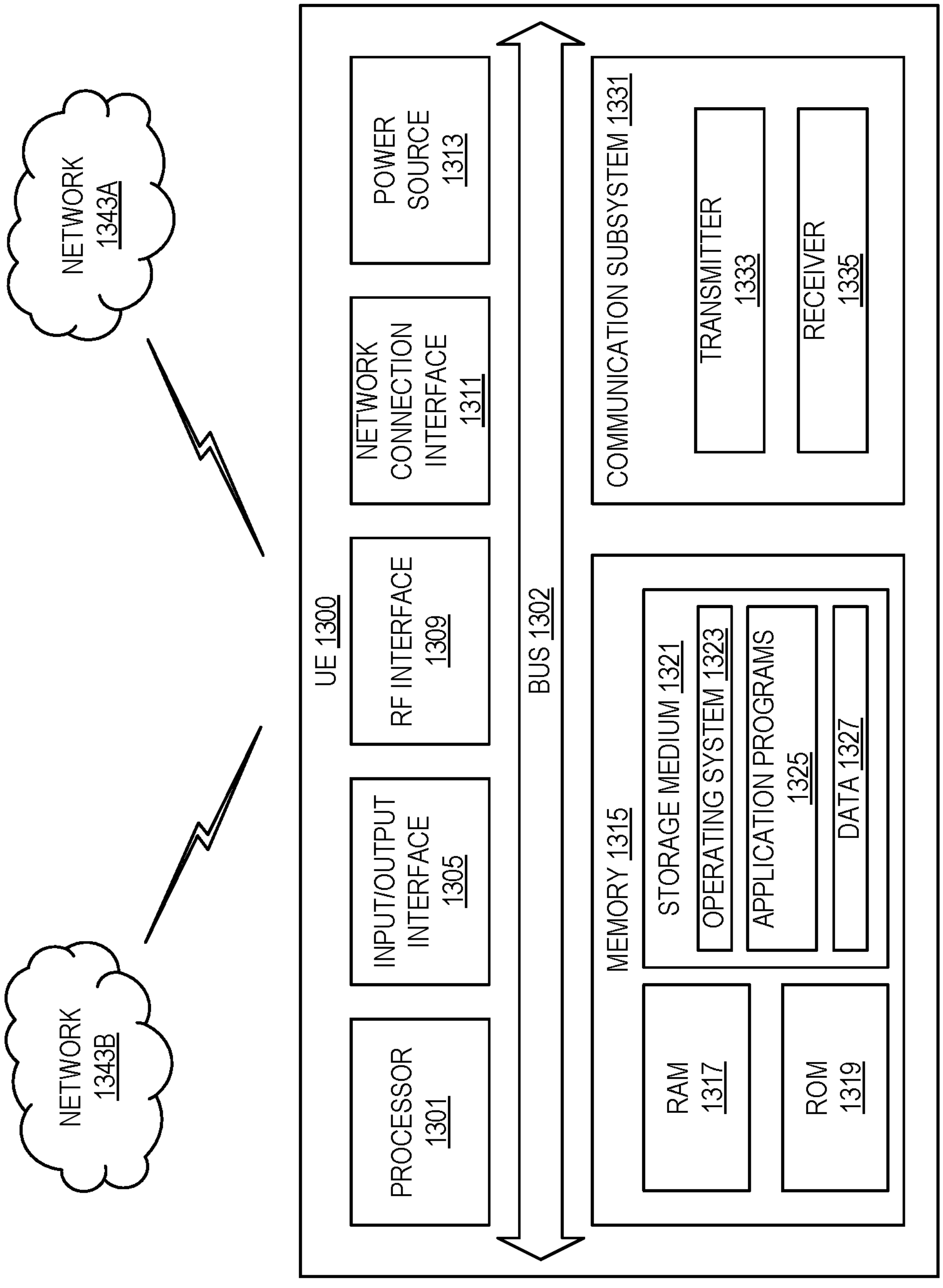
FIG. 13 illustrate a UE in accordance with some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the 3rd Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the 3 rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network **1343*a*. Network 1343*a* may encompass wired and/or wireless networks such as a local-area network (LAN), a wide-area network (WAN), a computer network, a wireless network, a telecommunications network, another like network or any combination thereof. For example, network 1343*a* may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311** may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS)

optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343*b* using communication subsystem 1331. Network 1343*a* and network 1343*b* may be the same network or networks or different network or networks. Communication subsystem 1331 may be configured to include one or more transceivers used to communicate with network 1343*b*. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343*b* may encompass wired and/or wireless networks such as a local-area network (LAN), a wide-area network (WAN), a computer network, a wireless network, a telecommunications network, another like network or any combination thereof. For example, network 1343*b* may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
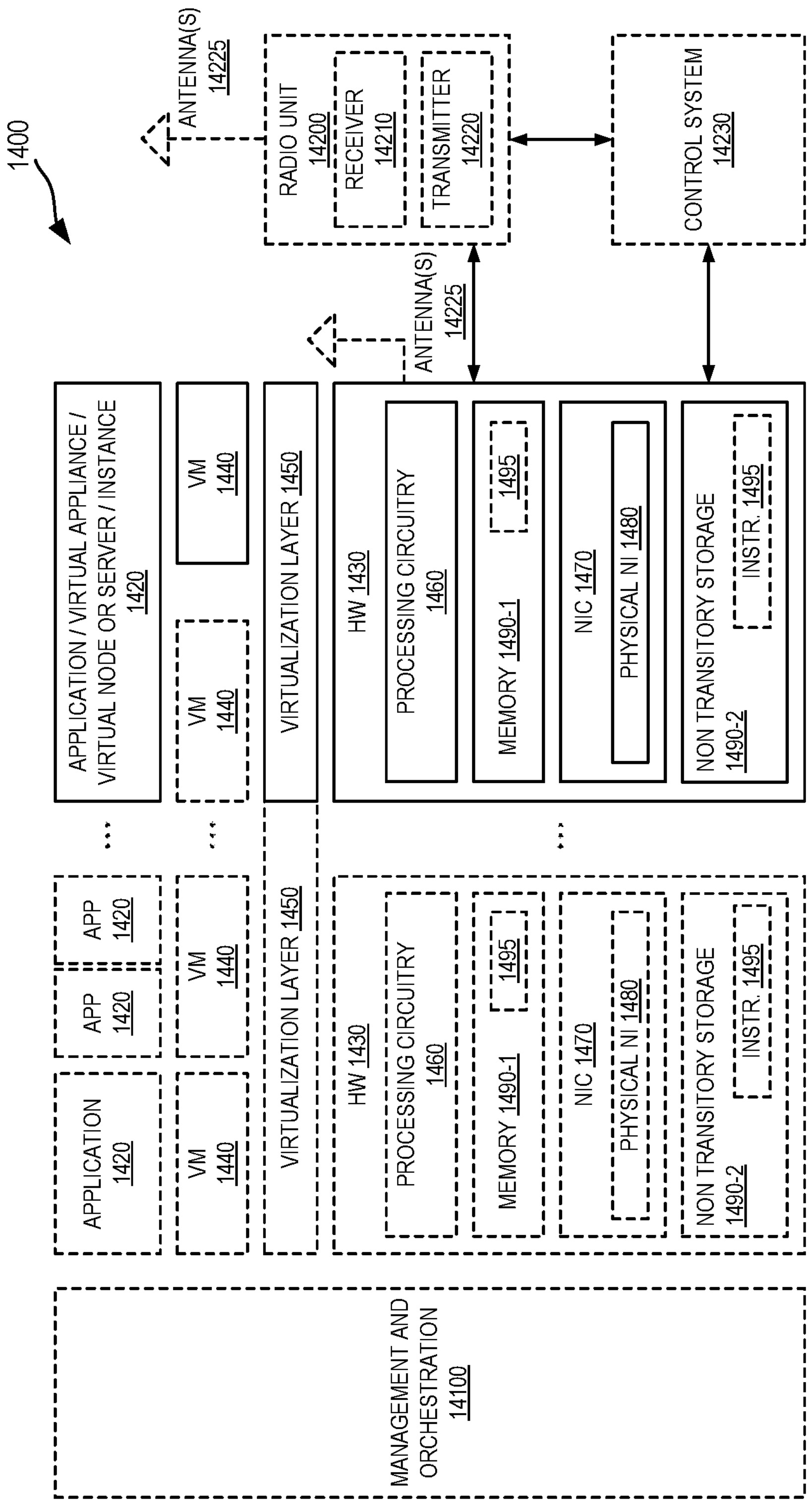
FIG. 14 illustrates a virtualization embodiment in accordance with some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g., such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
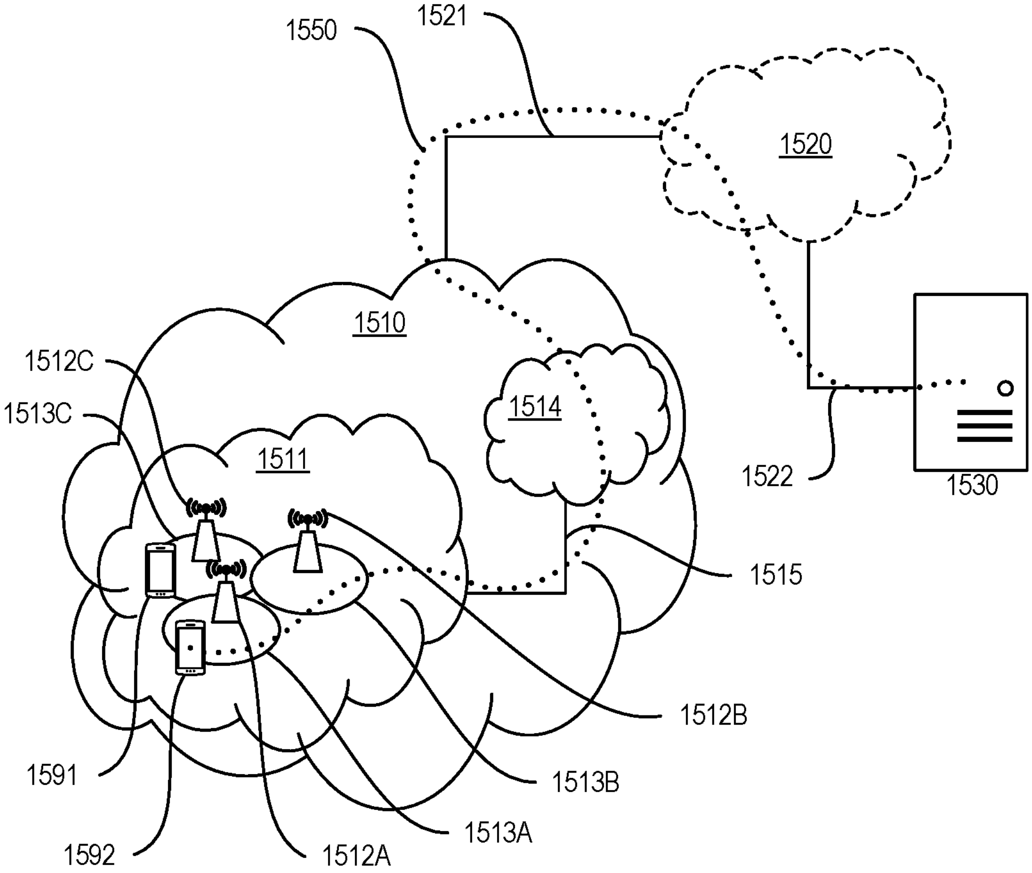
FIG. 15 illustrates a telecommunications network connected via an intermediate network to a host computer in accordance with some embodiments.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to core network 1514 over a wired or wireless connection 1515. A first UE 1591 located in coverage area 1513*c* is configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private, or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

Figure 16:
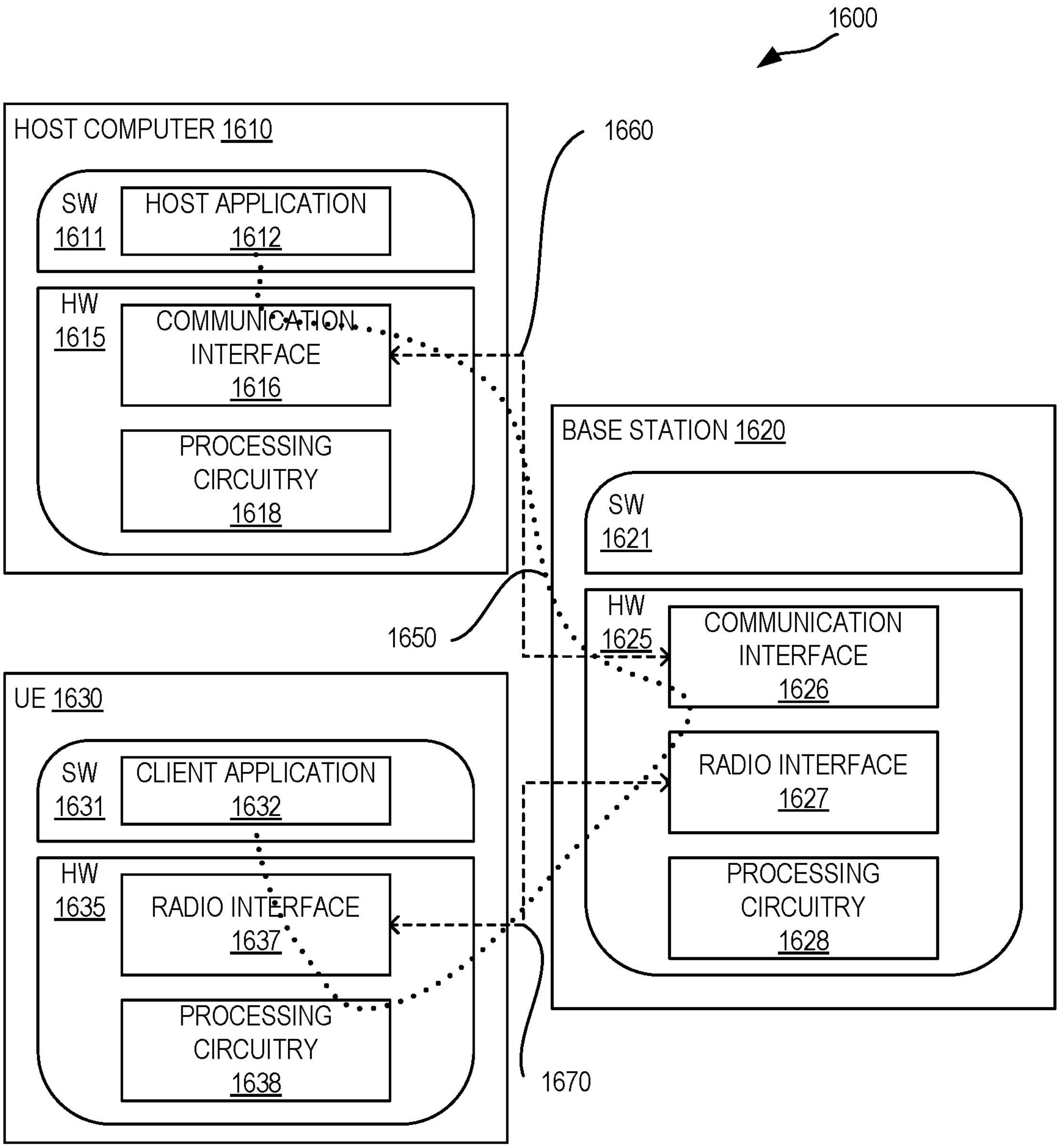
FIG. 16 illustrates a host computer communicating via a base station with a UE over a partially wireless connection in accordance with some embodiments.

It is noted that host computer 1610, base station 1620 and UE 1630 illustrated in FIG. 16 may be similar or identical to host computer 1530, one of base stations 1512*a*, 1512*b*, 1512*c* and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the teachings of these embodiments may improve the, e.g., data rate, latency, power consumption, and thereby provide benefits such as reduced waiting time, relaxed restriction on file size, better responsiveness, and extended battery lifetime.

A measurement procedure may be provided for the purpose of monitoring data rate, latency, and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
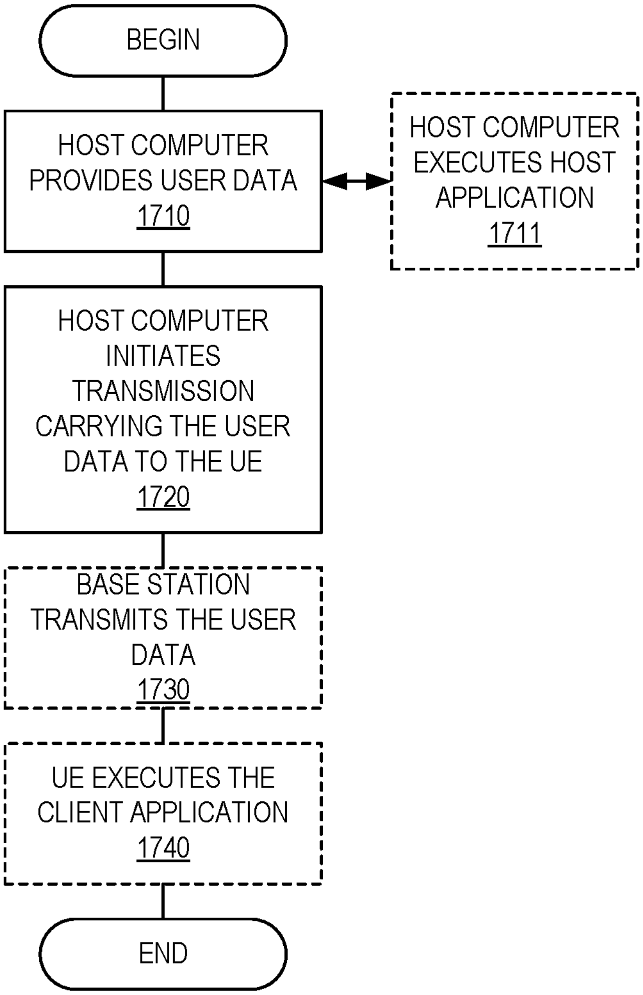
FIGS. 17, 18, 19, and 20 illustrates methods implemented in a communication system including a host computer, a base station, and a UE in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
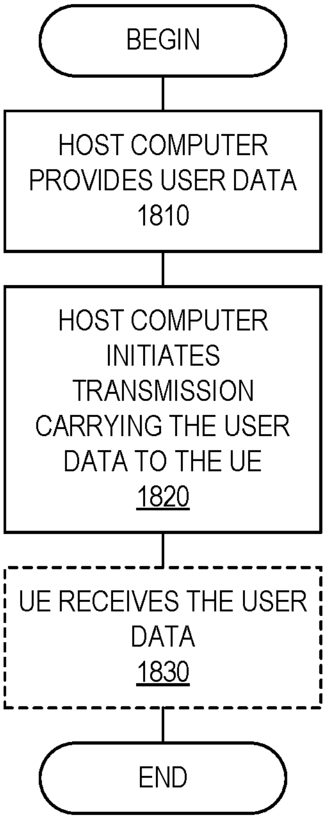

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
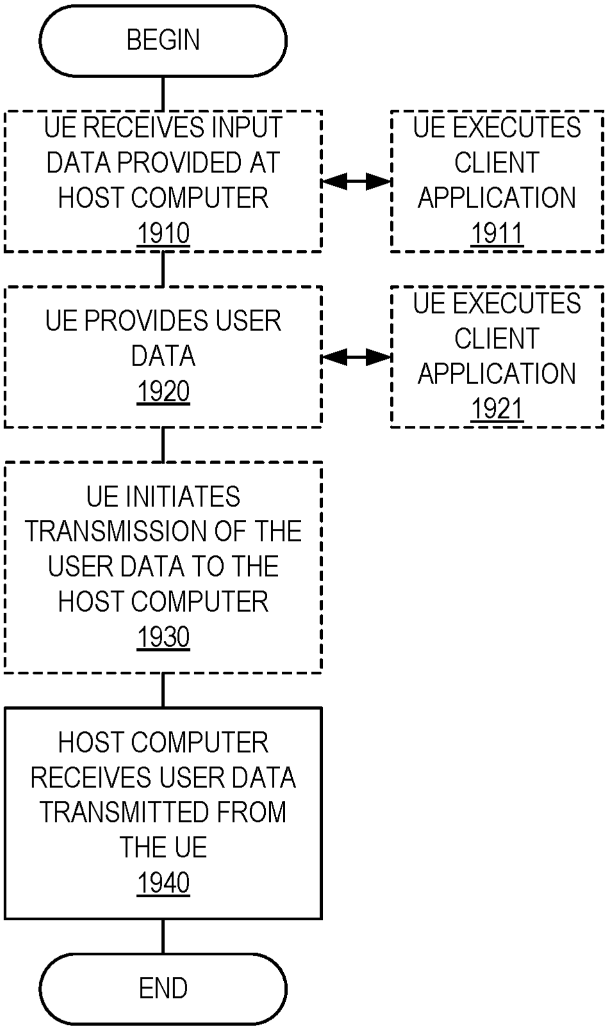

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
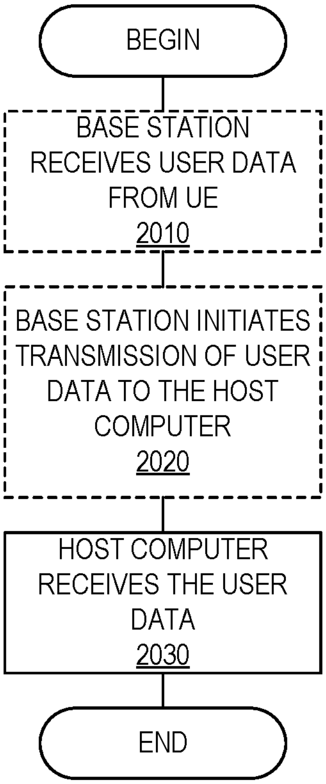

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Those skilled in the art will recognize improvements and modifications to the embodiments of the present disclosure. All such improvements and modifications are considered within the scope of the concepts disclosed herein.

The invention claimed is:

1. A method performed by a User Equipment, UE, the method comprising:

receiving, at a Radio Resource Control, RRC, layer of the UE, an indication to release a Quality of Experience, QoE, measurement configuration from a network node; and either:

determining that a session associated with the QoE measurement configuration is ongoing, and in response to the determining, refraining, at the RRC layer of the UE, from sending a release request for the QoE measurement configuration to an application layer of the UE until a session associated with the QoE measurement configuration has ended; or sending, from the RRC layer of the UE to the application layer of the UE, a request to release the QoE measurement configuration that indicates that the application layer is to release the QoE measurement configuration once the session associated with the QoE measurement configuration has ended.

2. The method of claim 1, wherein the method comprises refraining, at the RRC layer of the UE, from sending the release request for the QoE measurement configuration to the application layer of the UE until the session associated with the QoE measurement configuration has ended.

3. The method of claim 2 further comprising:

prior to receiving, at the RRC layer of the UE, the indication to release the QoE measurement configuration, receiving, at the RRC layer of the UE from the application layer of the UE, a start indication that indicates that the session associated with the QoE measurement configuration has started; and after receiving, at the RRC layer of the UE, the indication to release the QoE measurement configuration, the determining that the session associated to the QoE measurement configuration is ongoing is based on reception of the start indication but not a stop indication for the session associated with the QoE measurement configuration.

4. The method of claim 3 further comprising, after receiving, at the RRC layer of the UE, the indication to release the QoE measurement configuration:

receiving, at the RRC layer of the UE from the application layer of the UE, a stop indication for the session associated to the QoE measurement configuration; and sending, from the RRC layer of the UE to the application layer of the UE, a release request for the QoE measurement configuration responsive to receiving the stop indication for the session associated to the QoE measurement configuration at the RRC layer of the UE.

5. The method of claim 4 further comprising, at the application layer of the UE:

receiving the release request for the QoE measurement configuration from the RRC layer of the UE; and releasing the QoE measurement configuration upon receiving the release request from the RRC layer of the UE.

6. The method of claim 5 further comprising sending, from the application layer of the UE to the RRC layer of the UE, a confirmation that the QoE measurement configuration has been released.

7. The method of claim 5 further comprising sending, from the RRC layer of the UE to the network node, a confirmation that the QoE measurement configuration has been released.

8. The method of claim 1, wherein the method comprises sending, from the RRC layer of the UE to the application layer of the UE, the request to release the QoE measurement configuration that indicates that the application layer is to release the QoE measurement configuration once the session associated with the QoE measurement configuration has ended.

9. The method of claim 8 further comprising, at the application layer of the UE:

receiving, from the RRC layer of the UE, the request to release the QoE measurement configuration that indicates that the application layer is to release the QoE measurement configuration once the session associated with the QoE measurement configuration has ended; and releasing the QoE measurement configuration once the session associated with the QoE measurement configuration has ended, responsive to receiving the request to release the QoE measurement configuration that indicates that the application layer is to release the QoE measurement configuration once the session associated with the QoE measurement configuration has ended.

10. A method performed in a network node, the method comprising:

refraining from sending a command to release a Quality of Experience, QoE, measurement configuration to a User Equipment, UE, until an indication that a session associated to the QoE measurement configuration has completed is received from the UE;

receiving, from the UE, an indication that the session associated to the QoE measurement configuration has completed; and responsive to receiving the indication that the session associated to the QoE measurement configuration has completed, sending, to the UE, a command to release the QoE measurement configuration.

11. The method of claim 10 wherein the steps of refraining, receiving, and sending are performed at a Radio Resource Control, RRC, layer of the network node.

12. A network node comprising processing circuitry configured to cause the network node to:

refrain from sending a command to release a Quality of Experience, QoE, measurement configuration to a User Equipment, UE, until an indication that a session associated to the QoE measurement configuration has completed is received from the UE;

receive, from the UE, an indication that the session associated to the QoE measurement configuration has completed; and responsive to receiving the indication that the session associated to the QoE measurement configuration has completed, send, to the UE, a command to release the QoE measurement configuration.

* * * * *